United States Patent
Atherton et al.

(10) Patent No.: US 11,614,559 B2
(45) Date of Patent: Mar. 28, 2023

(54) IMAGE QUALITY TEST ARTICLE SET

(71) Applicant: Battelle Memorial Institute, Columbus, OH (US)

(72) Inventors: Eric Atherton, Middletown, NJ (US); Matthew Aderholdt, Vineland, NJ (US); Joseph Regensburger, Grove City, OH (US); Lucinda Flaherty, Bradenton, FL (US); Joseph Cochran, Egg Harbor Township, NJ (US)

(73) Assignee: Battelle Memorial Institute, Columbus, OH (US)

( * ) Notice: Subject to any disclaimer, the term of this patent is extended or adjusted under 35 U.S.C. 154(b) by 12 days.

(21) Appl. No.: 17/078,028

(22) Filed: Oct. 22, 2020

(65) Prior Publication Data

US 2021/0055450 A1 Feb. 25, 2021

Related U.S. Application Data

(62) Division of application No. 15/514,247, filed as application No. PCT/US2015/052473 on Sep. 25, 2015, now Pat. No. 10,871,591.

(Continued)

(51) Int. Cl.
*G01V 5/00* (2006.01)
*G01T 1/02* (2006.01)
(Continued)

(52) U.S. Cl.
CPC .............. *G01V 5/005* (2013.01); *G01T 1/02* (2013.01); *G01V 5/0008* (2013.01); *G01V 13/00* (2013.01); *G01T 7/005* (2013.01)

(58) Field of Classification Search
CPC .................. A61B 8/587; A61N 5/1075; A61N 2005/1076; G01R 33/58; G01N 2223/3035; G01T 1/02; G01T 7/005
See application file for complete search history.

(56) References Cited

U.S. PATENT DOCUMENTS

| 4,646,334 A | 2/1987 | Zerhouni |
| 4,655,716 A | 4/1987 | Hoevel |

(Continued)

FOREIGN PATENT DOCUMENTS

| GB | 2504258 A | * | 1/2014 | ............ A61B 6/037 |
| GB | 2504258 A | | 1/2014 | |

OTHER PUBLICATIONS

IEEE, American National Standard for Evaluating the Image Quality of X-ray Computed Tomography (CT) Security-Screening Systems Sponsored by the National Committee on Radiation Instrumentation, N42, Accredited by the American National Standards Institute, Mar. 23, 2011, XP055232403, downloaded at https://ieeexplore.ieee.org/stampPDF/getPDF.jsp?tp=&arnumber=5783279 [retrieved on Dec. 1, 2015].

(Continued)

*Primary Examiner* — Dani Fox
*Assistant Examiner* — Soorena Kefayati
(74) *Attorney, Agent, or Firm* — Benesch, Friedlander, Coplan & Aronoff LLP

(57) ABSTRACT

A dosimeter assembly being placed within an inner volume of a test article for evaluating an image produced by an x-ray computed tomography (CT) system. The dosimeter assembly includes: a dosimeter having a display, a dosimeter shelf that supports the dosimeter; and an alignment bracket that positions the dosimeter on the dosimeter shelf. The dosimeter shelf is operable to be mounted within the x-ray computed tomography system test article, and the display of the dosimeter is viewable through a dosimeter window which is disposed at a front end of the x-ray computed tomography system test article, wherein the dosimeter assembly is accessible through an access panel directly beneath the dosimeter assembly, the access panel being an opening which is disposed on a base of the x-ray computer (Continued)

tomography system test article. The dosimeter is operably connected to a connection interface which is configured to exchange communication with an external device.

9 Claims, 18 Drawing Sheets

Related U.S. Application Data

(60) Provisional application No. 62/056,231, filed on Sep. 26, 2014.

(51) Int. Cl.
    *G01V 13/00*    (2006.01)
    *G01T 7/00*    (2006.01)

(56) References Cited

U.S. PATENT DOCUMENTS

| | | | |
|---|---|---|---|
| 5,003,180 A | 3/1991 | Christianson | |
| 5,015,554 A | 5/1991 | Ruckert | |
| 5,049,754 A * | 9/1991 | Hoelscher | G01T 1/02 250/482.1 |
| 5,115,134 A * | 5/1992 | Slowey | G01T 1/185 250/374 |
| 5,210,783 A | 5/1993 | Wallace | |
| 5,221,842 A * | 6/1993 | Shepherd | G01T 1/02 250/252.1 |
| 5,506,884 A * | 4/1996 | Goodenough | G01T 1/169 250/252.1 |
| 5,696,381 A * | 12/1997 | Quintern | G01J 1/1626 250/474.1 |
| 5,793,835 A * | 8/1998 | Blanck | A61B 6/583 378/207 |
| 5,938,605 A * | 8/1999 | Hasing | H05G 1/44 250/370.07 |
| 6,076,966 A * | 6/2000 | Stueve | A61B 6/583 378/207 |
| 6,198,108 B1 * | 3/2001 | Schweitzer | G01T 1/02 250/472.1 |
| 6,310,355 B1 | 10/2001 | Cadwalader | |
| 6,320,931 B1 | 11/2001 | Arnold | |
| 6,364,529 B1 * | 4/2002 | Dawson | A61N 5/1048 378/207 |
| 6,675,035 B1 | 1/2004 | Grable et al. | |
| 6,697,451 B2 | 2/2004 | Acharya et al. | |
| 6,967,343 B2 | 11/2005 | Batten et al. | |
| 7,056,019 B1 | 6/2006 | Hanson et al. | |
| 7,151,253 B2 | 12/2006 | Varchena et al. | |
| 7,227,629 B2 | 6/2007 | Feldchtein et al. | |
| 7,397,024 B2 | 7/2008 | Foulquier et al. | |
| 7,413,345 B1 * | 8/2008 | Spanswick | A61B 6/542 250/252.1 |
| 7,420,160 B2 | 9/2008 | Delaperriere et al. | |
| 7,667,191 B2 * | 2/2010 | Serban | G09B 23/32 250/252.1 |
| 8,022,374 B2 | 9/2011 | Seo et al. | |
| 8,085,898 B2 | 12/2011 | Agrawal et al. | |
| 8,308,362 B2 * | 11/2012 | Dove | A61B 6/583 378/207 |
| 8,517,608 B1 | 8/2013 | Arnold | |
| 8,708,562 B1 | 4/2014 | Nosil | |
| 9,435,895 B2 * | 9/2016 | Ruschin | G01T 7/005 |
| 9,750,479 B2 | 9/2017 | Singh | |
| 9,936,935 B1 | 4/2018 | Nosil | |
| 10,395,560 B2 | 8/2019 | Groenewald | |
| 2002/0061502 A1 | 5/2002 | Persohn et al. | |
| 2003/0086535 A1 | 5/2003 | Teppaz et al. | |
| 2003/0122544 A1 | 7/2003 | Parker et al. | |
| 2003/0163271 A1 | 8/2003 | Chell et al. | |
| 2003/0167142 A1 | 9/2003 | Chell et al. | |
| 2004/0228435 A1 | 11/2004 | Russell | |
| 2004/0245447 A1 | 12/2004 | Karasawa | |
| 2005/0078801 A1 * | 4/2005 | Georgeson | G01V 5/0008 378/207 |
| 2005/0176707 A1 | 8/2005 | Chen et al. | |
| 2005/0201066 A1 * | 9/2005 | Masui | G01T 1/02 361/727 |
| 2006/0002511 A1 | 1/2006 | Miller | |
| 2006/0227932 A1 * | 10/2006 | Chapin | B65G 21/14 378/57 |
| 2007/0183590 A1 | 8/2007 | Gray | |
| 2007/0210796 A1 | 9/2007 | Woo et al. | |
| 2008/0011946 A1 | 1/2008 | Suh et al. | |
| 2008/0023647 A1 * | 1/2008 | Patel | G01T 1/06 250/473.1 |
| 2008/0093544 A1 | 4/2008 | Wang | |
| 2008/0240364 A1 | 10/2008 | Main et al. | |
| 2009/0052755 A1 | 2/2009 | Herold et al. | |
| 2009/0236510 A1 * | 9/2009 | Lacroix | G01T 1/02 250/252.1 |
| 2010/0021378 A1 | 1/2010 | Rousso et al. | |
| 2010/0074414 A1 * | 3/2010 | Katsuda | G01T 1/169 378/207 |
| 2011/0076660 A1 | 3/2011 | Morris et al. | |
| 2011/0169616 A1 * | 7/2011 | Yoder | G01T 3/00 340/10.6 |
| 2011/0210735 A1 | 9/2011 | Trakic | |
| 2012/0061591 A1 * | 3/2012 | Yoder | G01T 1/10 250/473.1 |
| 2012/0068084 A1 * | 3/2012 | Li | G01T 1/10 250/483.1 |
| 2013/0129178 A1 | 5/2013 | Wieczorek | |
| 2013/0170611 A1 | 7/2013 | Beckmann et al. | |
| 2013/0202089 A1 | 8/2013 | Schubert et al. | |
| 2013/0292580 A1 | 11/2013 | Schubert et al. | |
| 2014/0016759 A1 | 1/2014 | Ngar et al. | |
| 2014/0170690 A1 * | 6/2014 | Ziegler | H01L 27/14683 435/287.1 |
| 2014/0347668 A1 | 11/2014 | Suita | |
| 2015/0036141 A1 * | 2/2015 | Adamovics | A61N 5/1071 356/432 |
| 2015/0076356 A1 * | 3/2015 | Gougelet | G01T 1/026 250/336.1 |
| 2015/0085993 A1 * | 3/2015 | Scheib | A61N 5/1071 378/207 |
| 2015/0088449 A1 | 3/2015 | Foxall | |
| 2015/0168565 A1 * | 6/2015 | Altavilla | B82Y 40/00 250/370.07 |
| 2015/0316657 A1 * | 11/2015 | Ruschin | G01T 1/04 250/252.1 |
| 2016/0155364 A1 | 6/2016 | Piron et al. | |
| 2016/0278734 A1 * | 9/2016 | Hong | A61B 6/583 |
| 2016/0279445 A1 * | 9/2016 | Ju | A61N 5/1039 |
| 2017/0122885 A1 | 5/2017 | Van Stevendaal et al. | |

OTHER PUBLICATIONS

International Search Report in International Application No. PCT/US2015/052473, dated Feb. 23, 2016 (6 pages).
Written Opinion in International Application No. PCT/US2015/052473, dated Feb. 23, 2016 (11 pages).
Seltzer, Stephen M., "CCRI(I)/09-07 Recent Dosimetry Activities at the NIST,"XP055232626, Mar. 26, 2009, downloaded at http://62.161.69.23/cc/CCRI(I)/Allowed/19/CCRI(I)09-07.pdf [retrieved on Dec. 1, 2015], pp. 1-33.
International Search Report in International Application No. PCT/US2015/052479, dated Feb. 22, 2016, 6 pages.
Written Opinion in International Application No. PCT/US2015/052479, dated Feb. 22, 2016, 11 pages.
"NEMA PET Scatter Phantom," Jan. 1, 2012, XP55511749, downloaded at http://www.cirsinc.com/file/Products/800/800%20DS%20121815.pdf (2 pages).
Extended European Search Report in European Patent Application No. EP 18180116.8, dated Oct. 10, 2018 (8 pages).

* cited by examiner

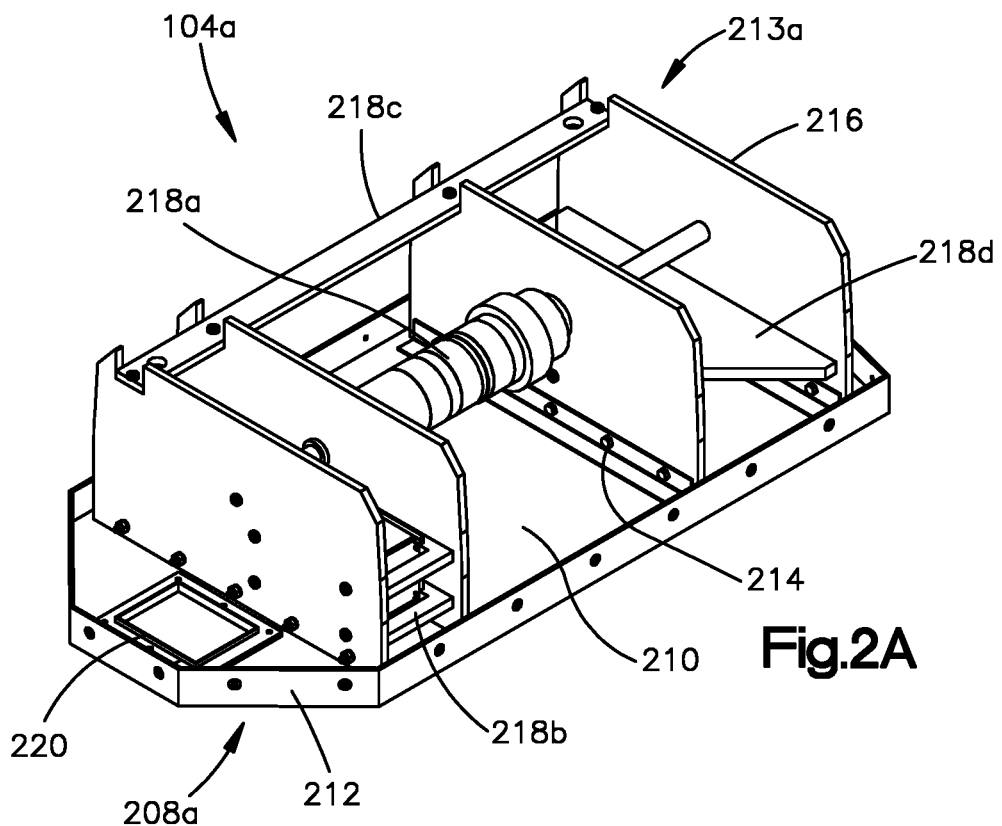
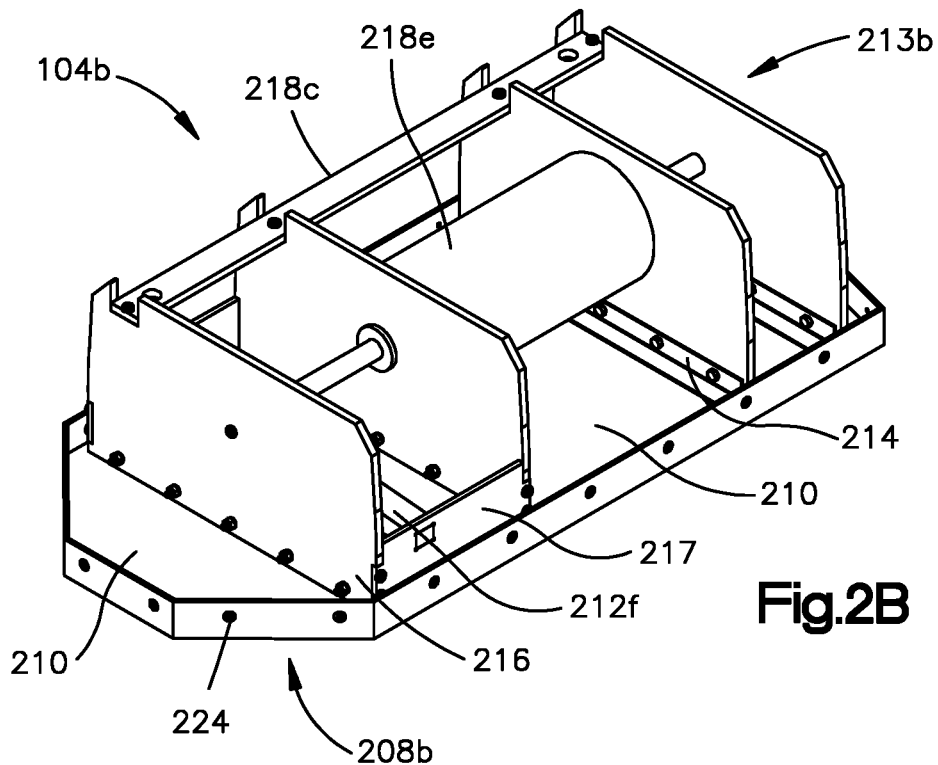

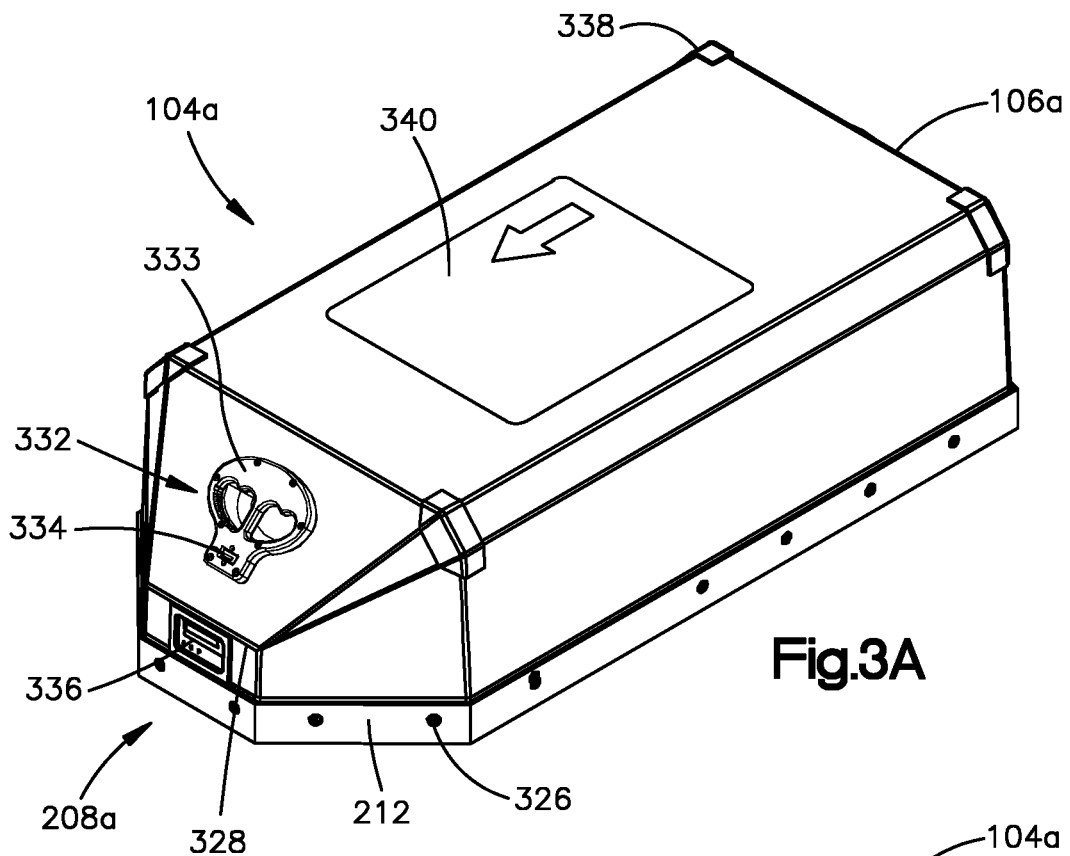
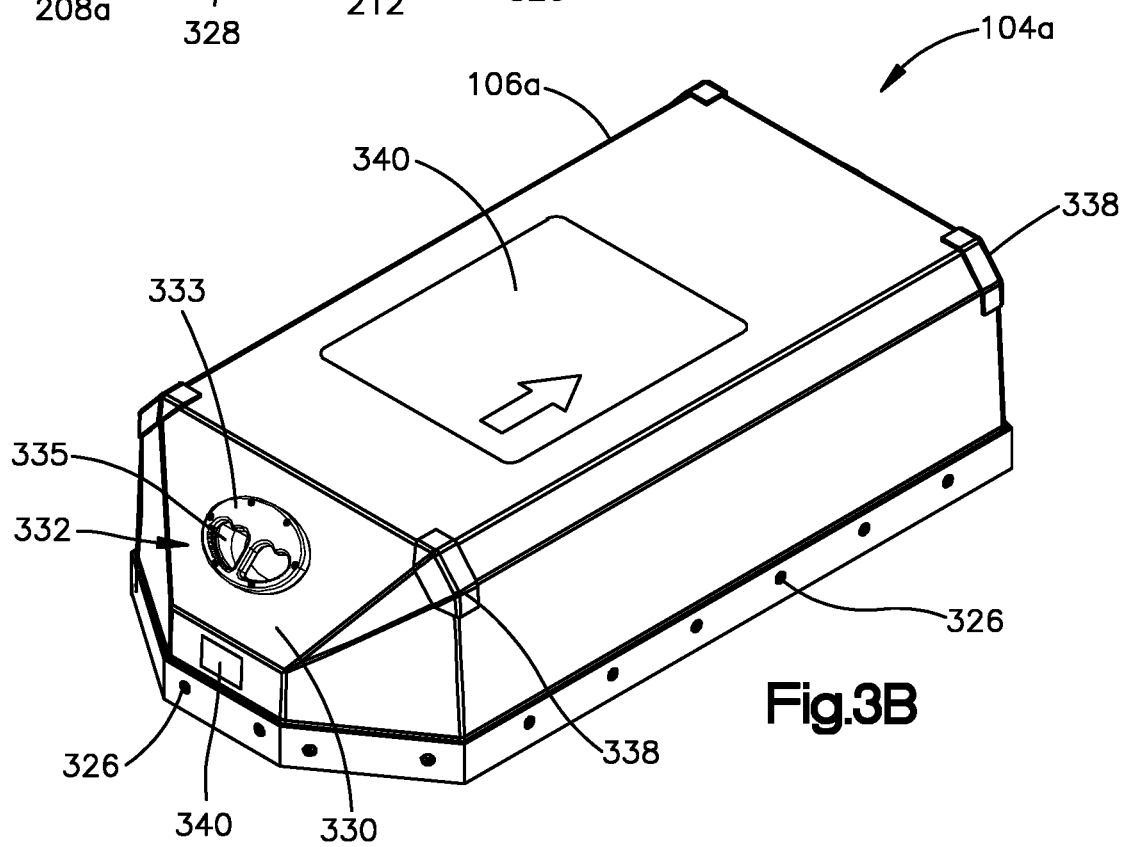

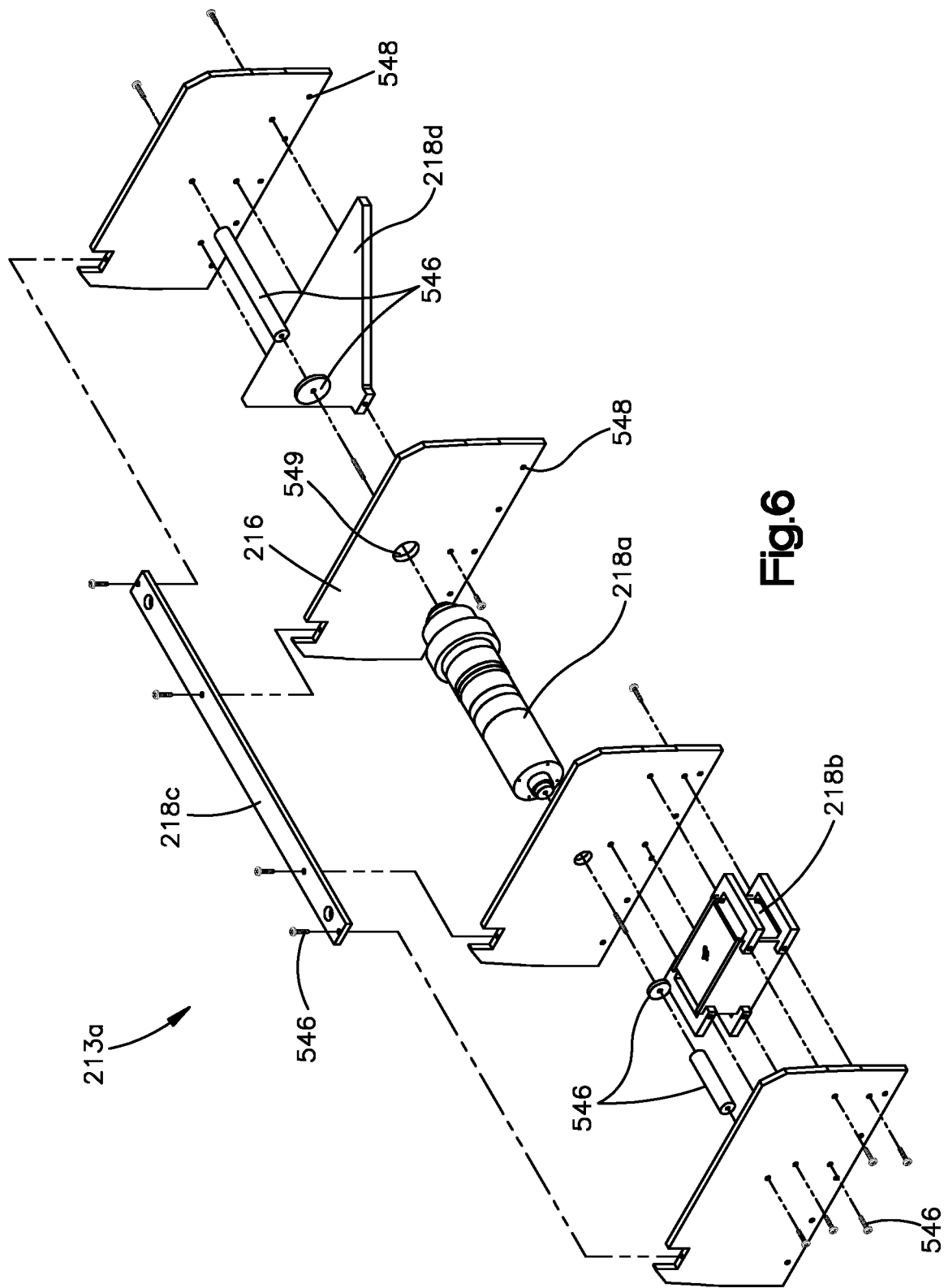

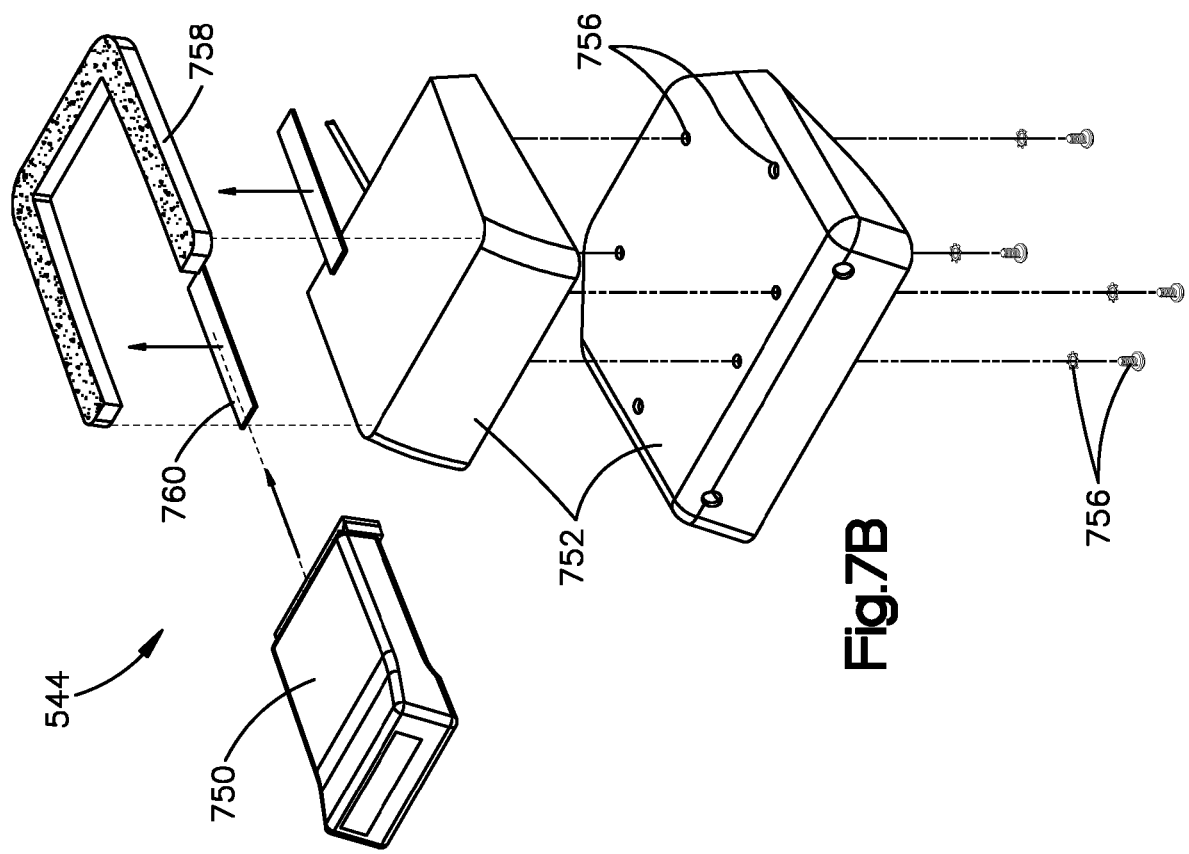
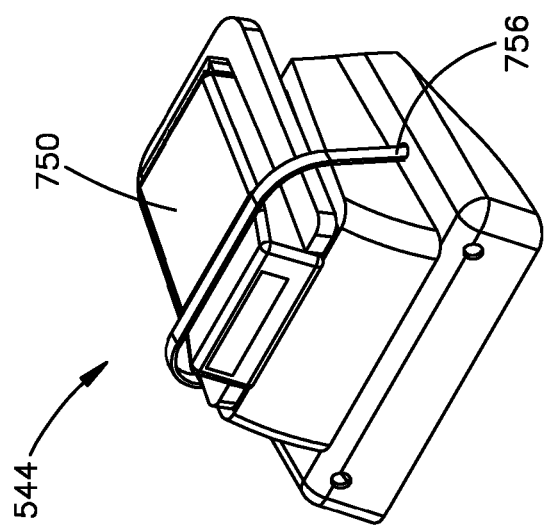

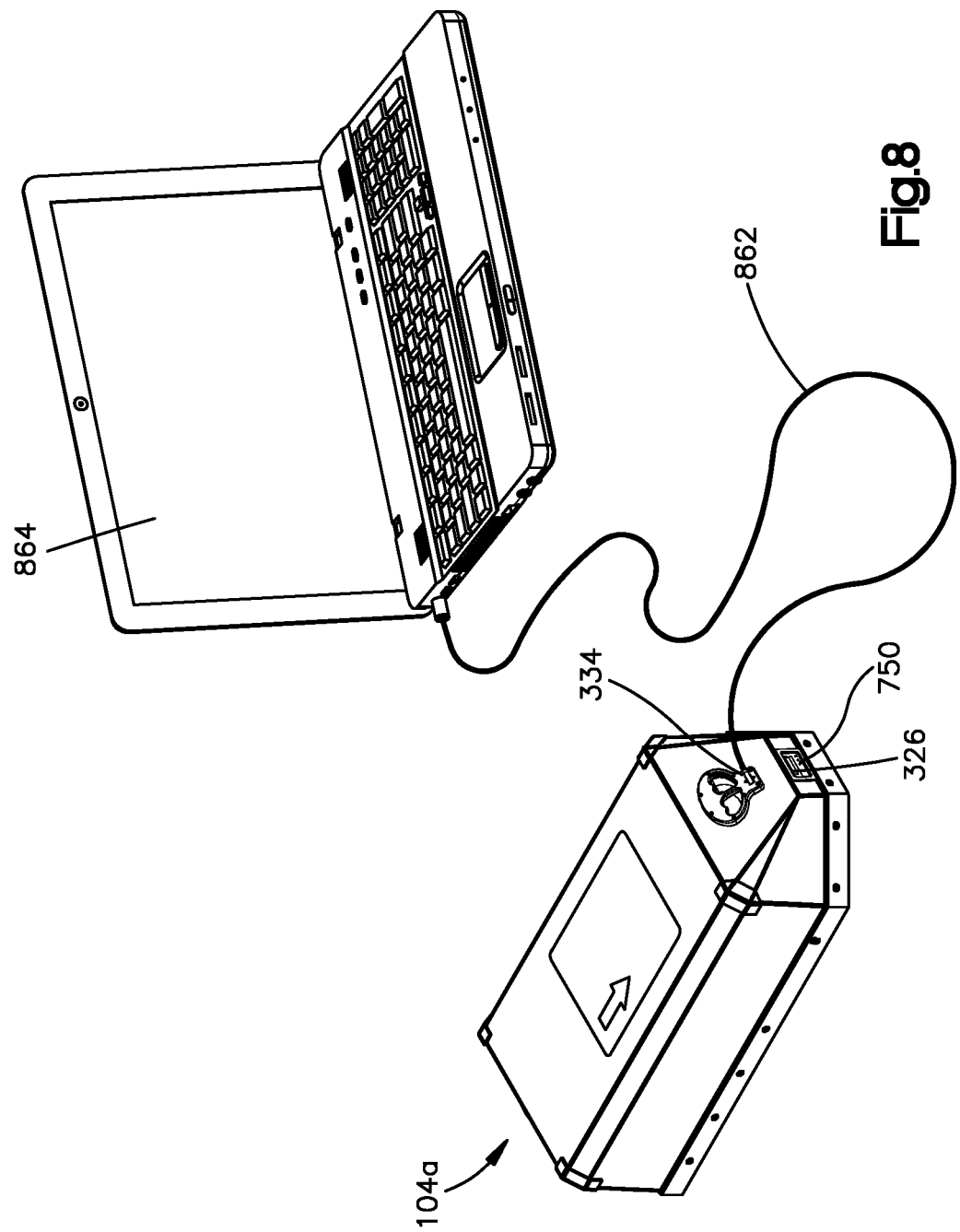

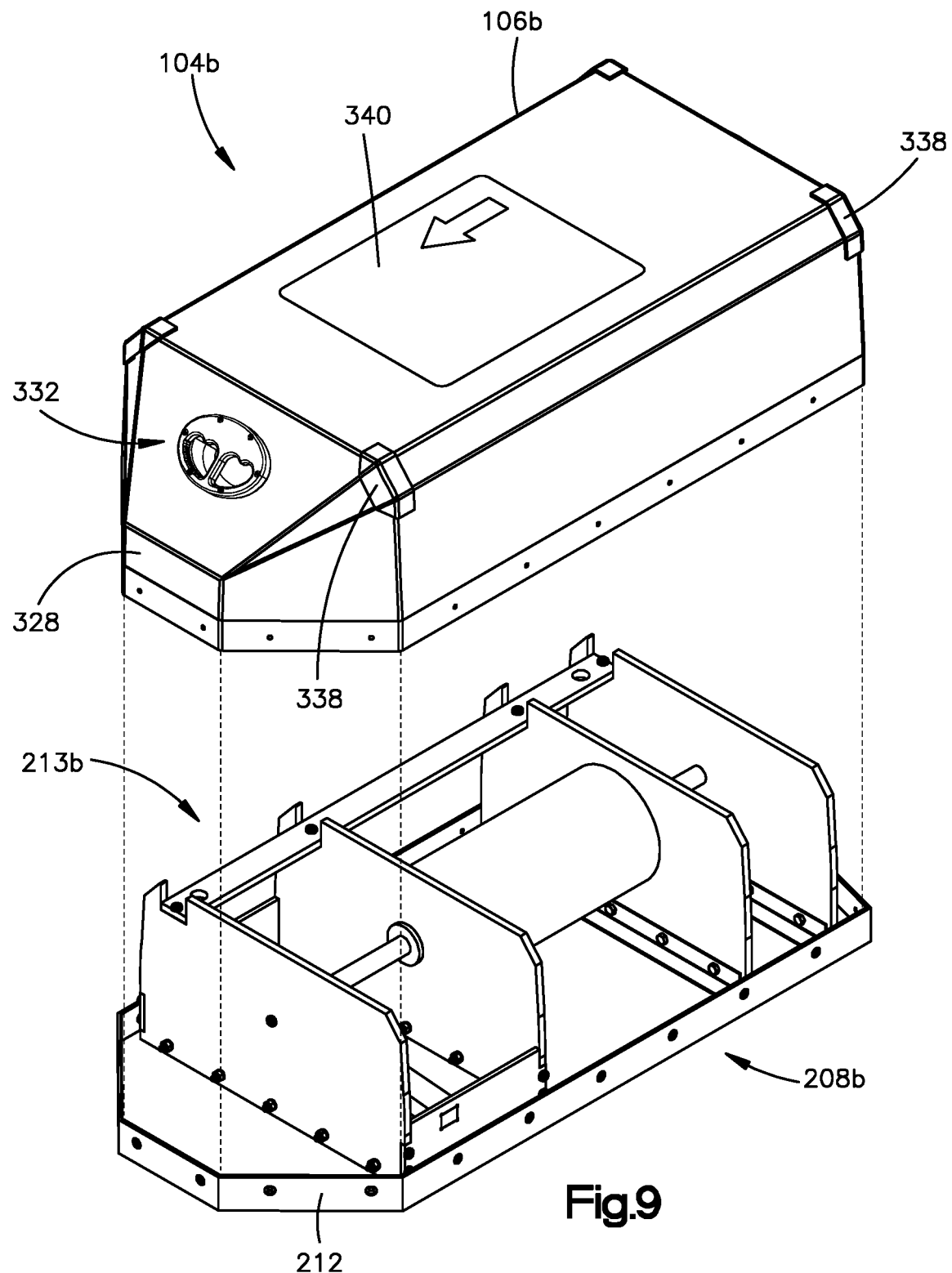

IMAGE QUALITY TEST ARTICLE SET

RELATED APPLICATION

This is a divisional application which claims the benefit of U.S. patent application Ser. No. 15/514,247 titled "IMAGE QUALITY TEST ARTICLE", filed on Mar. 24, 2017, which claims the benefit of International Patent Application No. PCT/US2015/052473, filed Sep. 25, 2015, entitled "IMAGE QUALITY TEST ARTICLE", which claims the benefit of U.S. Provisional Patent Application 62/056,231, filed Sep. 26, 2014, entitled "IMAGE QUALITY TEST ARTICLE SET". The entire contents of the above-identified applications are incorporated herein by reference.

GOVERNMENT RIGHTS

The United States government has rights in this invention pursuant to Contract No. HSTS04-10-D-ST3066 with the Transportation Security Administration (TSA), an agency of the United States Department of Homeland Security.

TECHNICAL FIELD

The present application relates to a test article set comprising various test objects within each test article used to assess and evaluate the overall image quality and other imaging-related metrics of image producing X-ray computed tomography (CT) security-screening systems

BACKGROUND

X-ray machine detection is commonly used for scanning containers, packages, parcels, and baggage (collectively referred to herein as "container(s)") at airports, seaports, and border crossings and may be employed for scanning mail and used by building security to scan containers entering buildings. X-ray machines may be used to detect explosives, drugs, or other contraband by analyzing a density of the item(s) under examination, and x-ray capabilities may be further enhanced with computed tomography (CT) imaging technology. X-ray CT imaging technology uses a computer to process x-rays into one or more slices of a specific area within a scanned container to allow an x-ray technician to see inside the container without the need to otherwise open the container. Further computer processing may be used to generate a three-dimensional image of the inside of the container from a series of two-dimensional x-rays images. Software with a pre-loaded threat library and graphical user interface (GUI) may be used to automate x-ray CT imaging to automatically detect threats and alert an x-ray technician to possible threats within the container.

Regulators of x-ray CT systems may require a technical standard or technical specification to establish uniform engineering, methods, processes, and practices related to x-ray CT systems. The American National Standards Institute (ANSI) has accredited technical standard ANSI N42.45-2011 for evaluating an image quality of x-ray CT security-screening systems in a factory or original equipment manufacturer (OEM) environment. Performance testing of x-ray CT systems following the standard evaluates an x-ray CT system's ability to produce an image of the container as well as the system software's ability to automatically analyze image data to make a threat determination.

The present application is directed to novel test articles and methods to evaluate the image quality of X-ray CT security-screening systems.

SUMMARY

In one embodiment, a system for assessing and evaluating an image producing x-ray computed tomography system containing a test object to be scanned with x-rays to produce an image is provided, the system for assessing evaluating comprising: at least one test article, the at least one test article configured to support one or more test objects within an inner volume, the at least one test article comprising: (1) an exterior shell assembly surrounding an inner volume; (2) a base assembly comprising a flat base portion; (3) a support structure comprising one or more partitions configured to support one or more test objects, and one or more brackets configured to attach to at least one of: a partition and the flat base portion; wherein the exterior shell assembly is configured to attach to the flat base portion of the base assembly such that the inner volume of the exterior shell assembly is bounded in part by the flat base portion of the base assembly; and wherein the base assembly is configured to attach to the exterior shell assembly, and the flat base portion is configured to support and attach to the support structure; and wherein the support structure is configured to attach to the flat base portion of the base assembly and to be positioned within the inner volume of the exterior shell assembly.

In another embodiment, a system for assessing and evaluating an overall image quality of an image producing x-ray computed tomography system, the system comprising: at least one test article, the at least one test article operable to support one or more test objects within an inner volume, the at least one test article further comprising: (1) an exterior shell assembly surrounding an inner volume and operable to attach to a base assembly; (2) a base assembly operable to attach a support structure and operable to attach to the exterior shell assembly; and (3) a support structure within the inner volume operable to support one or more test objects and operably attached to the base assembly; wherein the exterior shell assembly and the base assembly comprise a composite structure, the composite structure further comprising a hollow core structure, a resin matrix, and a reinforcement material, wherein the hollow core structure is an open cell hexagonal honeycomb design of polypropylene material and of a thickness of about 0.20 inches, and further comprises a polyester scrim cloth barrier on each open side of the hollow core structure, the polyester scrim cloth barrier thermo-fused to the hollow core structure; wherein the reinforcement material is a fiberglass cloth, the fiberglass cloth arranged in a multi-ply layering such that each ply of the multi-ply layering is arranged substantially orthogonal to a warp of an overlapping ply, each ply of the fiberglass cloth laminated to another ply of the fiberglass cloth by a resin matrix to form a multi-plied lamination, the multi-plied lamination of a ratio of about 70% fiberglass cloth to about 30% resin matrix, wherein the multi-plied lamination is of a thickness of about 0.018 inches; wherein the multi-plied lamination is further laminated to each open side of the polyester scrim cloth covered hollow core structure; wherein the exterior shell assembly and the base assembly are formed by vacuum bag molding the composite structure; wherein at least one end of the exterior shell assembly comprises a polyhedral frustum; wherein the exterior shell assembly comprises at least two handle assemblies extending into the inner volume, each handle assembly comprising a handle grip and a handle cup, the handle grip comprising at least four ergonomic notches; and wherein the base assembly and at least four corners of the exterior shell assembly are coated with a two-part polyurethane flex coat spray.

In another embodiment, a resin matrix consisting essentially of a mixture of the following materials in the proportions indicated is provided, the resin matrix: (a) about 78.32% resin by weight; (b) about 2.35% silicon dioxide by weight; (c) about 6.27% calcium carbonate by weight; (d) about 11.98% curing agent by weight; (e) about 0.29% dark blue dye by weight; (f) about 0.78% white dye by weight.

In another embodiment, a resin matrix consisting essentially of a mixture of the following materials in the weights indicated is provided, the resin matrix: (a) about 400.0 grams resin; (b) about 12.0 grams silicon dioxide; (c) about 32.0 grams calcium carbonate; (d) about 61.2 grams curing agent; (e) about 1.5 grams dark blue dye; (f) about 4.0 grams white dye.

In another embodiment, a dosimeter assembly for use in a x-ray computed tomography system test article is provided, the dosimeter assembly comprising: a dosimeter shelf; an alignment bracket; a dosimeter window; an access panel; and a connection interface.

In another embodiment, an acetal cylinder assembly is provided, the acetal cylinder assembly comprising: two or more annular metal devices; two or more acetal cylinder forming sections of the cylinder assembly, each of which is configured to interconnect with another, wherein a portion of at least two of the acetal cylinder sections is undercut for one of the annular metal devices to fit over the undercut portion such that an annular metal device is sized to fit over the undercut portion.

BRIEF DESCRIPTION OF DRAWINGS

The accompanying figures, which are incorporated in and constitute a part of the specification, illustrate various example systems and methods, and are used merely to illustrate various example embodiments.

FIG. 2A illustrates an example base assembly and support structure with test objects.

FIG. 2B illustrates an example base assembly and support structure with test objects.

FIG. 3A illustrates a front view of an example exterior shell assembly.

FIG. 3B illustrates a rear view of an example exterior shell assembly.

FIG. 6 illustrates an exploded view of an example test object support structure.

FIG. 7A illustrates an example dosimeter assembly.

FIG. 7B illustrates an exploded view of an example dosimeter assembly.

FIG. 8 illustrates an example interconnection between a test article and an external computing device.

FIG. 9 illustrates an exploded view of an example test article assembly.

DESCRIPTION OF EMBODIMENTS

Figure 1:
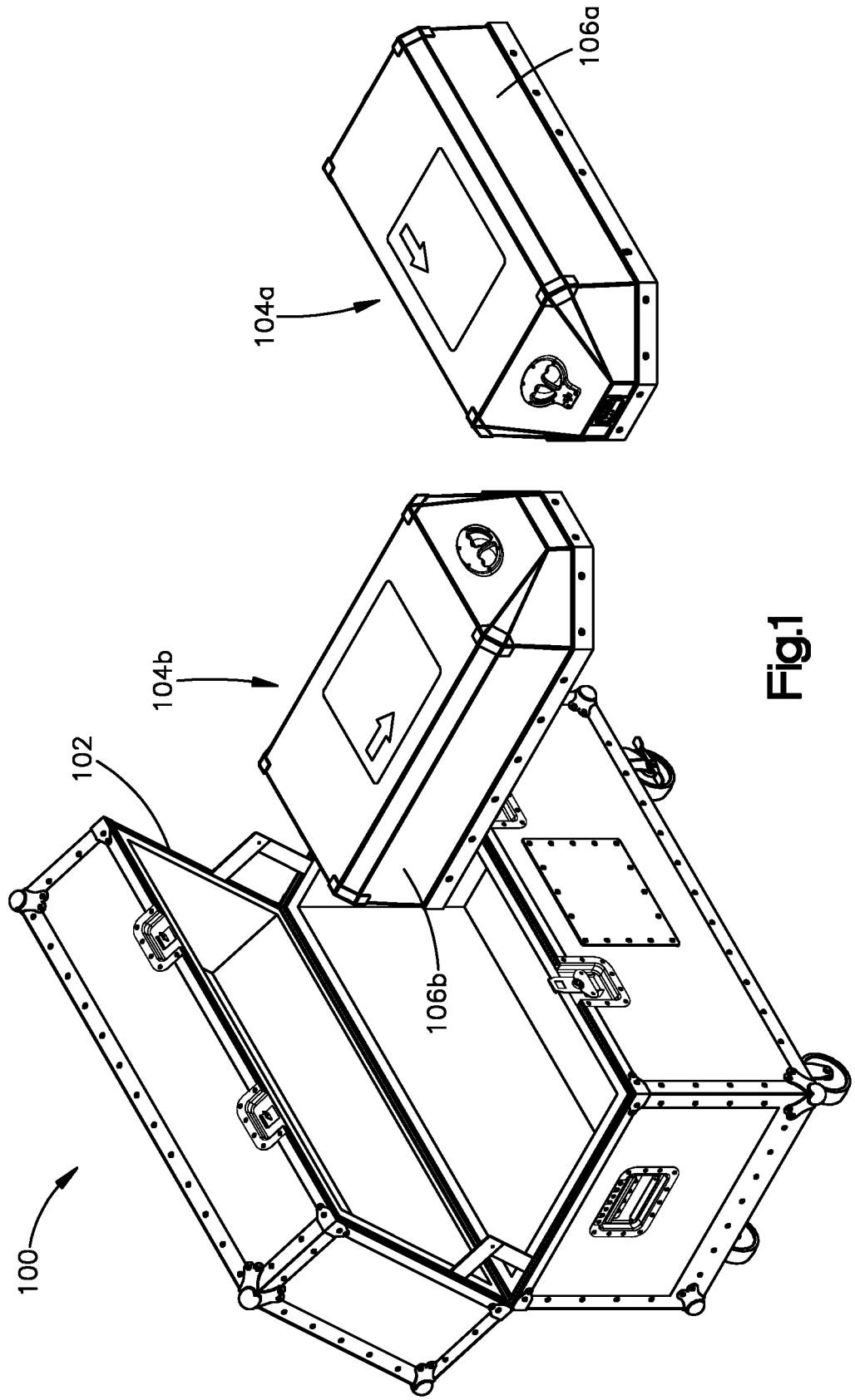
FIG. 1 illustrates example test articles and a storage/transport case.

The American National Standards Institute ("ANSI") has accredited standard ANSI 42.45-2011 ("the ANSI standard") for evaluating an image quality of x-ray computed tomography (CT) security-screening systems. While the ANSI standard establishes a test methodology and test objects used to evaluate an image quality of an x-ray CT security-screening system during performance testing of an x-ray CT security-screening system, the ANSI standard leaves much to be desired for a test article used to support test objects. As used herein, test article may be referred to interchangeably as "a case," "a test article," "a chassis," "a kit," and "a phantom."

The ANSI standard references use of an off the shelf plastic transit case—specifically, Pelican™ Case model 1650-001-110 manufactured by Pelican Products, Inc. of Torrance, Calif. The Pelican™ case specified in the standard is no longer manufactured and suitable replacements are not readily available.

Moreover, use of the Pelican™ case presented many issues in evaluating security screening systems. First, the polypropylene outer case construction of the Pelican™ case is heavy and thick and attenuates an x-ray beam of a security screening system under test. Attenuation of the x-ray beam negatively impacts evaluation of a security screening system's image quality. Use of the polypropylene case material also added to an overall weight of the Pelican case used in the ANSI standard.

The ANSI standard also proposes removing structural support ridges from the Pelican™ case to reduce artifacts (i.e. errors and misrepresentations) and noise in images produced from the Pelican™ case when used with a security screening system under test. Artifacts and noise in an image negatively influence image quality metrics. However, removing the structural support ridges from the Pelican™ case also reduced an overall robustness and durability of the Pelican™ case. Removal of support ridges may also be a challenging endeavor. Additionally, because metal components may cause unwanted artifacts and noise in an x-ray CT system image, the Pelican™ case had to have its metal hardware replaced with a plastic equivalent which is a tedious endeavor. The plastic hardware equivalent were often not as robust as their metal equivalent. For example, acrylic pins used in hinges often broke on account that the size and material of the pin could not withstand the same rigors as the metal equivalent.

The ANSI standard also references an acrylic support system for use in the Pelican case to support one or more test objects. The acrylic interior support system not only added to the overall weight of each the Pelican™ case, but was also easily damaged. Damage to the acrylic interior support system often involved shattering of the acrylic interior support system which would increase x-ray attenuation and cause test objects within the case to shift, both of which could negatively influence image quality metrics.

Factory Acceptance Test System:

Embodiments claimed herein discloses a system for assessing and evaluating an overall image quality of an image producing x-ray CT system.

With reference to FIG. 1, a system 100 for performance testing an image producing x-ray CT system is illustrated. System 100 may include storage and transport case 102 as well as test article 104a (phantom A) and test article 104b (phantom B). Storage and transport case 102 may be used to store test articles 104a, 104b when not in use. Use of storage and transport case 102 may protect test articles 104a, 104b from environmental exposure and other potential damage which may affect an ability of test articles 104a, 104b to properly evaluate an image producing x-ray CT system. An interior of storage and transport case 102 may be lined with a padding or foam material (not shown) to further protect test articles 104a, 104b from a negative interaction (i.e. bumping, rubbing, etc.) when inside storage and transport case 102. Further mechanical structures and supports may be used within transport case 102 to properly orient and support test articles 104a, 104b within storage and transport case 102. Orientation, spacing, and positioning of test objects within test articles 104a, 104b may be in accordance with a technical specification or standard. Transport case 102 may be sized and shaped to properly accommodate test articles 104a, 104b so as to limit movement of test articles 104a, 104b within transport case 102. Transport and storage case 102 may further include hardware such as: wheels to more easily facilitate movement of transport and storage case 102; bumpers and edge reinforcements to protect external surfaces of transport and storage case 102 from damage; and handles, locks, and pulls to lift and secure transport and storage case 102.

Exterior shell assembly 106a of test article 104a and exterior shell assembly 106b of test article 104b may be substantially similar in appearance and manufacture. Slight difference in exterior shell assembly 106a and 106b may reflect different functions of test articles 104a and 104b. In one embodiment, test article 104a is called "Phantom A" and a standard or specification specifies which test objects are supported within test article 104a. In another embodiment, test article 104b is called "Phantom B" and a standard or specification specifies which test objects are supported within test article 104b. Exterior shell assemblies 106a and 106b may be of a molded composite material. In a non-limiting embodiment, test articles 104a and 104b are approximately 37 inches in length, by about 18 inches in length, and about 10 inches in height.

With reference to FIGS. 2a and 2b, base assemblies 208a and 208b of test articles 104a and 104b are respectively illustrated. Base assemblies 208a and 208b may be of a molded composite material. With reference to FIG. 2a, base assembly 208a in conjunction with an internal support structure 213a of test article 104a may support various test objects 218a, 218b, 218c, and 218d. Base assembly 208a may include a substantially flat base portion 210 with a raised lip portion 212 extending around a perimeter portion of base assembly 208a. Raised lip portion 212 may include one or more through holes 224 to support a connection hardware (not shown) to connect exterior shell assembly 106a to base assembly 208a. Flat base portion 210 may support one or more brackets 214 for attaching internal support structure 213a to base assembly 208a. Internal support structure 213a may include one or more partitions 216 to support test objects 218a, 218b, 218c, and 218d. Various connection hardware (not shown) may secure: one or more brackets 214 to flat base portion 210, one or more partitions 216 to one or more brackets 214, and test objects 218a, 218b, 218c, and 218d to one or more partitions 216. Partitions 216 may be of a hard plastic such as acrylonitrile butadiene styrene (ABS) or as specified by a technical specification or other technical standard.

In one embodiment, a standard or specification specifies that test objects 218a, 218b, 218c, and 218d must be used in test article 104a. Test objects may be used for measuring a wide range of image quality indicators.

Test object 218a may be an acetal cylinder wrapped with layers of aluminum, copper, tin, and lead, and imbedded with tungsten alloy pins to conduct both effective atomic number ($Z_{eff}$) and CT value uniformity and streak artifact test procedures. Effective atomic number uniformity is a material property that represents an atomic number of a theoretical element that, if replaced by the actual element, would produce the same x-ray attenuation characteristics. CT value is a value reported by CT systems on a per voxel basis that is a function of a material's density and atomic number. The streak artifact test procedure measures an amount of streaks produced by metal pins in a plastic object.

Test object 218b may be a box of acetal and aluminum plates arranged to form a box with a diagonal acetal plate used for an image registration test procedure. Image registration test object 218b may be used to test physical alignment between imaging subsystem frames of reference.

Test object 218c may be an acetal plate with a machined hole in each end. Test object 218c may be used to test object length accuracy.

Test object 218d is an acetal triangle used to test path length CT value and $Z_{eff}$. Acetal triangle test object 218d measures consistency of density and $Z_{eff}$ along a variable x-ray path length.

Flat base portion of 210 of base assembly 208a may include access panel 220 for access into an interior volume of test article 104a when exterior shell assembly 106a is secured to base assembly 208a. Alternatively, access panel 220 may be on exterior shell assembly 106a. While test objects may be engineered, machined, and manufactured to exact tolerances, once test objects are arranged within an interior volume of test articles 104a and 104b to an exact arrangement (i.e. spatial coordinates) specified by a standard or specification, exterior shell assembly 106a may be secured to base assembly 208a limiting access to an inner volume of test article 104a. Access panel 220 may provide access to a portion of an inner volume separate from test objects, for example, to access additional diagnostic equipment and measurement devices within an inner volume of test article 104a.

Referring to FIG. 2b, base assembly 208b similar to base assembly 208a described above, includes a flat base portion 210 that supports a raised lip portion 212 and may have one or more bracket 214/partition 216 assemblies affixed thereto to form an internal support structure 213b that may support various test objects 218c, 218e, and 218f. Internal support structure 213b may include additional support hardware like component support 217 used to support test object 212f in an orientation specified by a technical standard or specification.

Test object 218e may be an acetal cylinder used to test noise equivalent quanta (NEQ) and CT value consistency. NEQ test object 218e may provide an indication of image quality by providing in-plane special resolution of a device under test normalized against noise. Test object 218e may also be used to test CT value consistency. CT value consistency test object 218e may provide an indication of image quality by providing an average CT value measurement and providing a variance of CT values.

Test object 218*f* may be an acetal rectangular bar presented at about 5° to measure a slice sensitivity profile (SSP). SSP test object 218*f* may provide an indication of image quality by testing a resolution of an image in a same direction of a system's belt movement.

Both base assemblies 208*a* and 208*b* may be coated with a polyurethane flex-coat spray to provide added protection and reinforcement to base assemblies 208*a* and 208*b*. Polyurethane flex-coating of base assemblies 208*a* and 208*b* may also provide additional traction for test articles 104*a* and 104*b* when used on conveyor belt driven x-ray CT systems and prevent unwanted movement of test articles 104*a* and 104*b* about the conveyor belt which may negatively affect an evaluation of x-ray CT imaging systems. In one embodiment, exterior portions (i.e. portions not operatively connected to an inner volume of test articles 104*a* and 104*b*) of base assemblies 208*a* and 208*b* are sprayed with a polyurethane flex-coat. In another embodiment, all of base assemblies 208*a* and 208*b* are sprayed with polyurethane flex-coat. In one embodiment, base assemblies 208*a* and 208*b* may be molded from polyurethane.

Figure 2C:
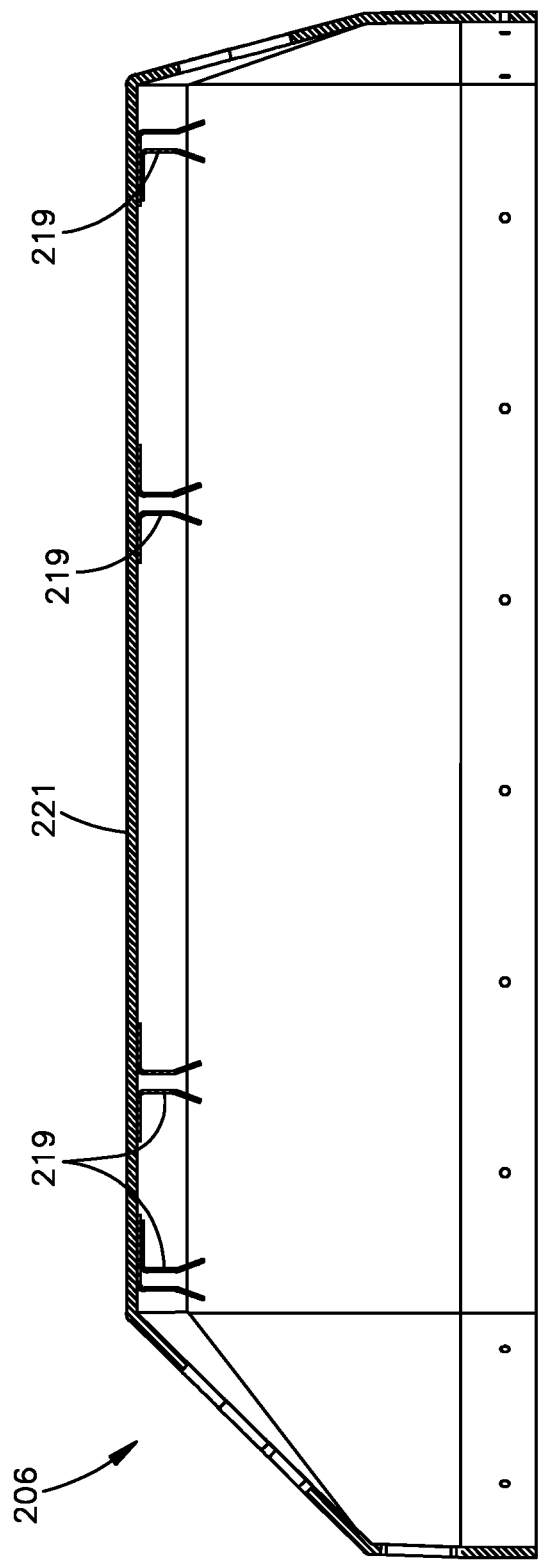
FIG. 2C illustrates an example exterior shell assembly.

With reference to FIG. 2*c*, an exterior shell assembly 206 is illustrated. Exterior shell assembly 206 may include brackets 219 attached to an interior ceiling portion 221 of exterior shell assembly 206. In one embodiment, brackets 219 are secured to an interior ceiling portion of exterior shell assembly 206 with an adhesive. Brackets 219 may align with, and captivate partitions 216 on base assemblies 208*a* and 208*b*. Because of the unique position of brackets 216 on base assemblies 208*a* and 208*b*, brackets 219 may be uniquely positioned within exterior shell assemblies 106*a* and 106*b* to align with corresponding partitions 216 on base assemblies 208*a* and 208*b*. Brackets 219 may counteract an overturning moment of interior support structures 213*a* and 213*b* to keep interior support structures 213*a* and 213*b* in place should test articles 104*a* and 104*b* be dropped.

Referring to FIGS. 3*a* and 3*b*, front and rear views of test article 104*a* are illustrated. Exterior shell assembly 106*a* may attach to base assembly raised lip portion 212 of base assembly 208*a*. One or more through holes 224 may support connection hardware 326. As metal components may have a negative effect on x-ray CT system image quality and cause streaking, connective hardware components such as connection hardware 326 may be of a plastic material. In one embodiment, connection hardware 326 is a plastic rivet. In another embodiment, connection hardware 326 is a plastic screw. Connection hardware 326 may be chosen based on a desired function, for example plastic rivets may be used to prevent or limit exterior shell assembly 106*a* from being removed from base assembly 208*a* to prevent access to an inner volume of test assembly 104*a* and the test objects therein.

Exterior shell assembly 106*a* may include a polyhedral frustum shaped front end 328. Polyhedral frustum shaped front end 328 may be similar in shape to a truncated pyramid. The shape of front end 328 may assist test article 104*a* in parting heavy curtains on conveyor belt driven x-ray CT systems. Rear end 330 of exterior shell assembly 106*a* may be of similar polyhedral frustum shape. Both front end 328 and rear end 330 may include a handle assembly 332.

Handle assembly 332 may be of an ergonomic design and includes handle cover 333 over a handle cup 335. Handle cup 335 may be secured to exterior shell assembly 106*a* and extends into an inner volume of test article 104*a*. Handle cup 335 may provide a recessed area for a user's fingers to facilitate carrying of test articles 104*a*. Handle cup 335 may also prevent foreign objects or moisture from entering an inner volume of test article 104*a*. A user may extend fingers through handle cover 333 and into handle cup 335 to facilitate carrying of test article 104*a*. Handle cover 333 may provide ergonomic notches that may match contours of a user's fingers. In one embodiment, handle cover 333 may include interface 334 which may provide a wired or wireless connection to other electrical devices such as diagnostic equipment and measurement devices within an inner volume test article 104*a*. Test articles 104*a* and 104*b* may include one or more handle assemblies 332.

Front end 328 may also include a window 336 for viewing a display of diagnostic equipment and measurement devices within an inner volume of test article 104*a*. In one embodiment, a dosimeter may be placed within an inner volume of test article 104*a* and used to measure a x-ray dose during an evaluation of a x-ray CT imaging system. Window 336 may allow a technician to view a display of a dosimeter within an inner volume of test article 104*a*.

One or more corners of exterior shell assemblies 106*a* and 106*b* may be covered with a polyurethane flex-coat treatment or polyurethane corner appliqué as a polyurethane corner protection 338 to reinforce and protect corners of exterior shell assemblies 106*a* and 106*b*. Polyurethane corner protection 338 may be a polyurethane corner appliqué 338 molded into shape. In one embodiment, polyurethane corner protection 338 is a molded appliqué of another material coated with polyurethane flex coat. In another embodiment, polyurethane corner protection 338 is a direct application of a polyurethane flex-coat spray to one or more corners of exterior shell assemblies 106*a* and 106*b*.

Exterior shell assembly 106*a* may also support various indicia 340 thereon. Indicia 340 may be used to provide operating instructions and identification for test article 104*a*.

Figure 4B:
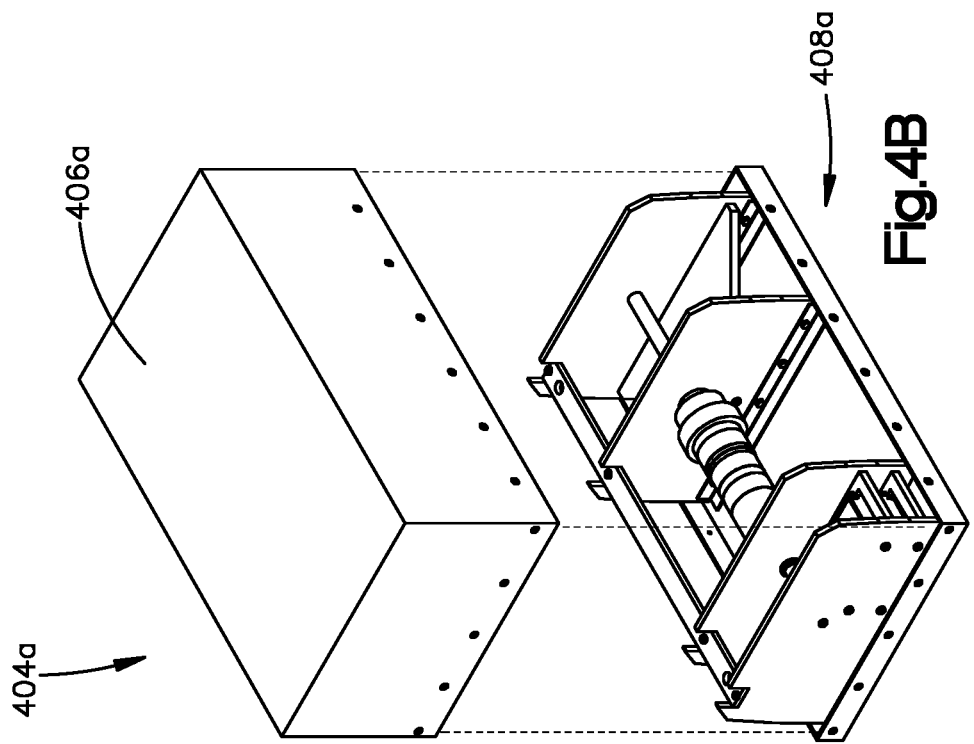
FIG. 4B illustrates an exploded view of an example test article assembly.
Figure 4A:
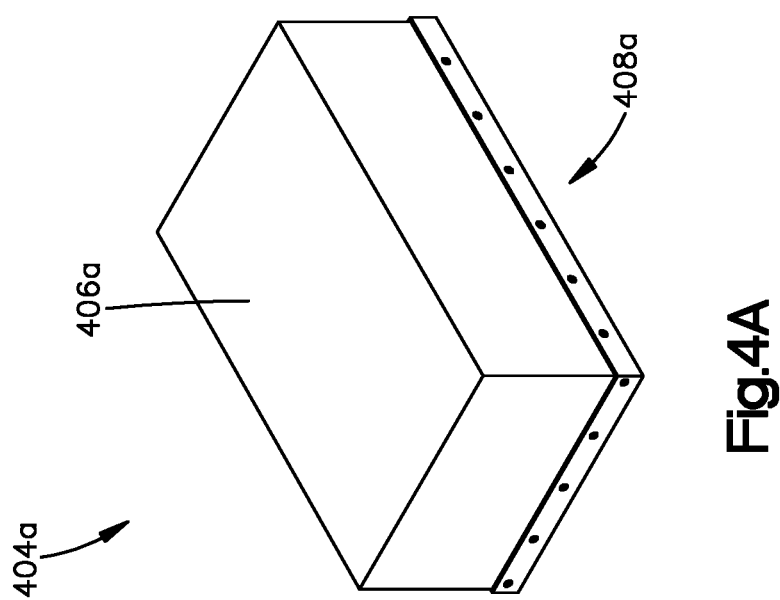
FIG. 4A illustrates a perspective view of an example test article assembly.

With reference to FIG. 4A, an example test article 404*a* is illustrated. Test article 404*a* may include a rectangular prism-shaped exterior shell assembly 406*a* and a rectangular-shaped base assembly 408*a*. With reference to FIG. 4B an exploded view of test article 404*a* showing rectangular prism-shaped exterior shell assembly 406*a* and rectangular-shaped base assembly 408*a* is shown.

Figure 5:
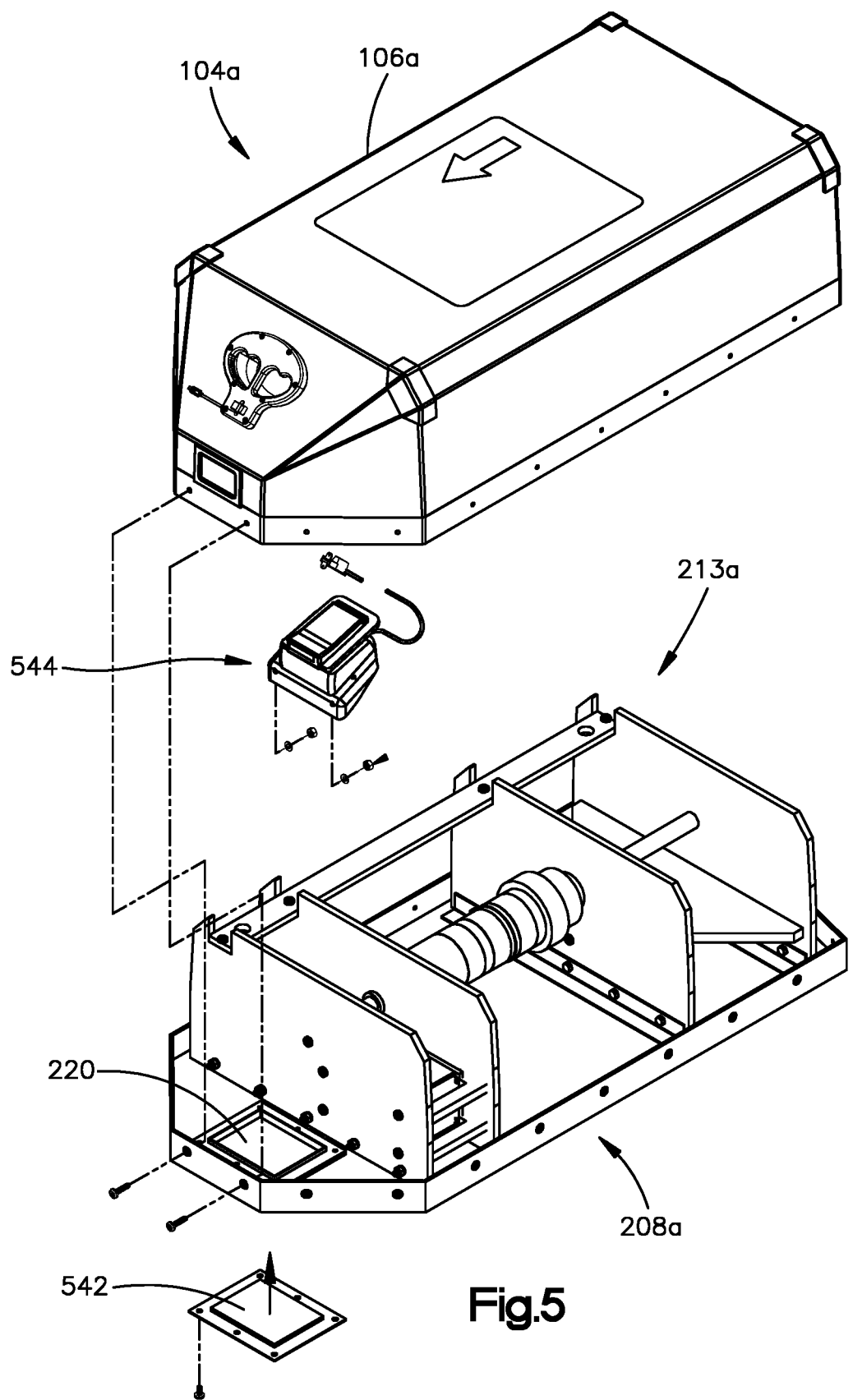
FIG. 5 illustrates an exploded view of an example test article assembly.

With reference to FIG. 5, an exploded view of test article 104*a* is illustrated. In addition to previously described components within an inner volume of test article 104*a*, test article 104*a* may also include dosimeter assembly 544. Dosimeter assembly 544 may include a dosimeter for measuring X-radiation dosage. A display of dosimeter on dosimeter assembly 544 may be viewed through window 336. Access to dosimeter assembly 544, for example, to turn dosimeter on/off, change batteries, etc., may be through access panel 220 after access door 542 is removed from base assembly 208*a*.

Referring to FIG. 6, an exploded view of internal support structure 213*a* is illustrated. Internal support structure 213*a* may use one or more partitions 216 and connection hardware 546 to support test objects 218*a*, 218*b*, 218*c*, and 218*d*. Connection hardware 546 may be a variety of internally threaded and externally threaded components that connect to both test objects 218*a*, 218*b*, 218*c*, and 218*d* and each other. Connection hardware 546 may be screws, standoffs, rods, rivets, washers, and the like. In one embodiment, connection hardware 546 may be of a plastic material that does not affect an x-ray CT system image. One or more partitions 216 may have one or more through holes 548 for receiving connection hardware 216. One or more partitions 216 may include cylinder support hole 549 which receives a mounting extension on acetal cylinder 218*a* for support of acetal cylinder 218*a*.

With reference to FIGS. 7a and 7b, an example dosimeter assembly 544 is illustrated. Dosimeter assembly 544 may include a dosimeter 750, one or more components to form a dosimeter shelf 752, and through holes and blind holes (collectively "holes" 754) to receive dosimeter connection hardware 756 to interconnect dosimeter assembly 744 components. In one embodiment, dosimeter connection hardware 756 may be screws and washers operable to interconnect one or more portions of dosimeter shelf 752. In another embodiment, dosimeter connection hardware 756 may be a cable tie/tie-wrap type fastener for securing dosimeter 750 to dosimeter shelf 752. Alignment bracket 758 may be provided to provide proper alignment of dosimeter 750 on dosimeter shelf 752. Alignment bracket 758 may be attached to shelf 752, with, for example, adhesive hardware 760. Dosimeter assembly 744 may be used with test articles 104a and 104b to provide a proper positioning and secure arrangement of dosimeter 750 within test articles 104a and 104b. For example, shelf 752 may be designed to provide for easy readability of a display on dosimeter 750 through window 360. Design of shelf 752 may vary based on different dosimeter types.

With reference to FIG. 8 an example interconnection between test article 104a and an external computing device 864 is illustrated. Test articles 104a or 104b may have connection interfaces, such as interface 334, for connection to an external computing device 864. An interior volume of test articles 104a and 104b may support instrumentation and other electrical devices that may connected to an external computing device 864 via interface 334 to allow for two-way communication between external computing device 864 and instrumentation within an inner volume of test articles 104a and 104b. In one embodiment, data from a dosimeter 750 within an inner volume of test article 104a is extracted to an external computing device 864 and dosimeter settings and parameters are controlled from an external computing device 864. In another embodiment, interface 334 is a universal serial bus (USB) connector that allows USB cord 862 to connect to interface 334. Interface 334 may provide a wired or wireless interface and may act as a hub to support a wired or wireless connection between one or more external computing devices 864 and one or more instruments/electrical devices within an inner volume of test articles 104a and 104b. In one embodiment, an intermediary device, such as a wireless reader device wiredly connects to interface 334 and wirelessly communicates with dosimeter 750. External computer device 864 may be any number of processor driven devices such as a computer (laptop, desktop, etc.), a tablet, a smart phone, and the like.

Figure 10:
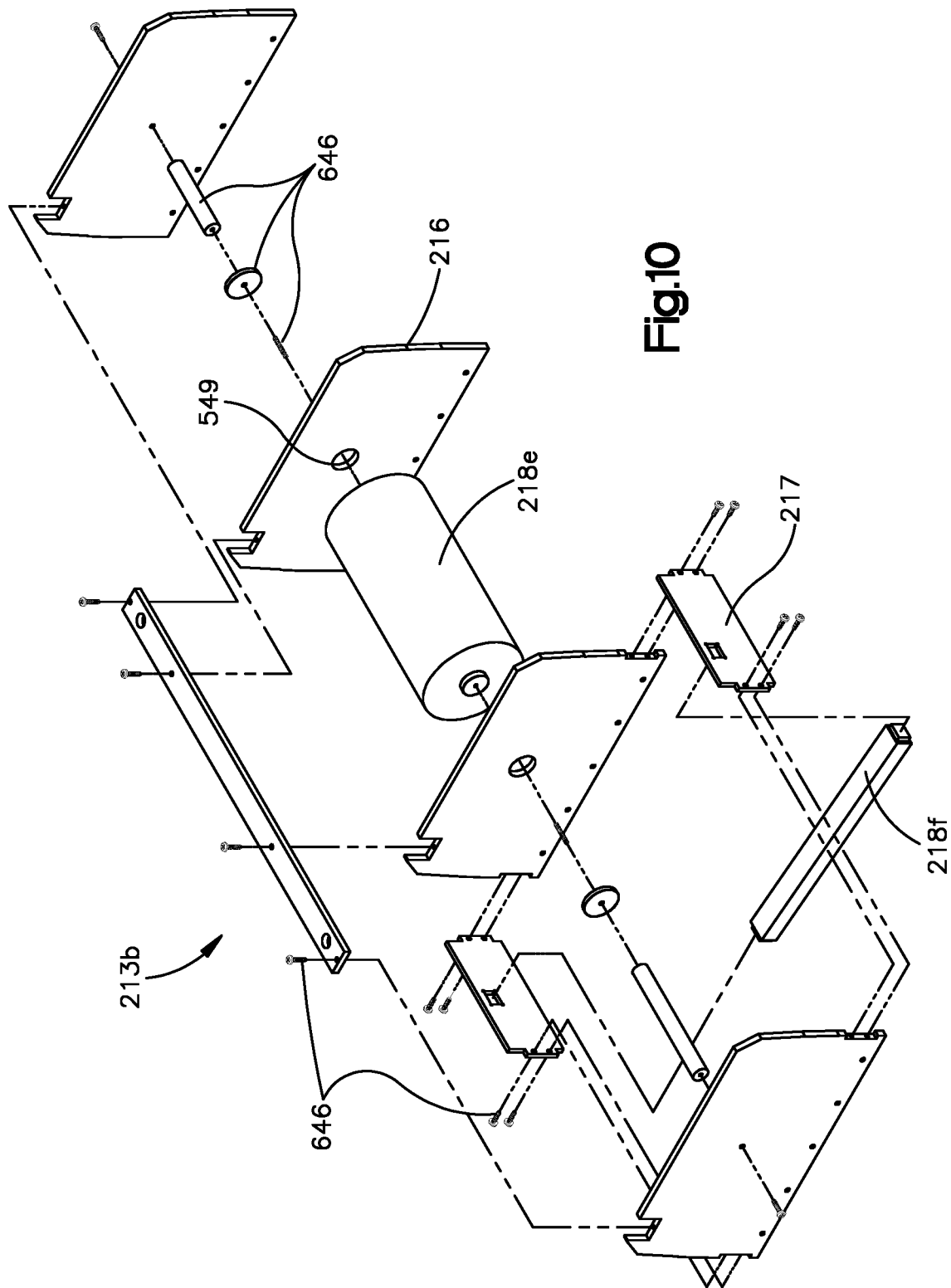
FIG. 10 illustrates an exploded view of an example test object support structure.

With reference to FIGS. 9 and 10 an exploded view of test article 102b and internal support structure 213b including test objects 102c, 102e, and 102f are illustrated. As previously described, test article 104b may be similar to test article 104a and may be adapted to support test objects 102e, and 102f that are not included in test article 104a. Likewise, internal support structure 213b may be similar to internal support structure 213a with partitions 116 and connection hardware 646. Cylinder support hole 549 on partitions 116 may be used to support test object 102e.

Figure 11:
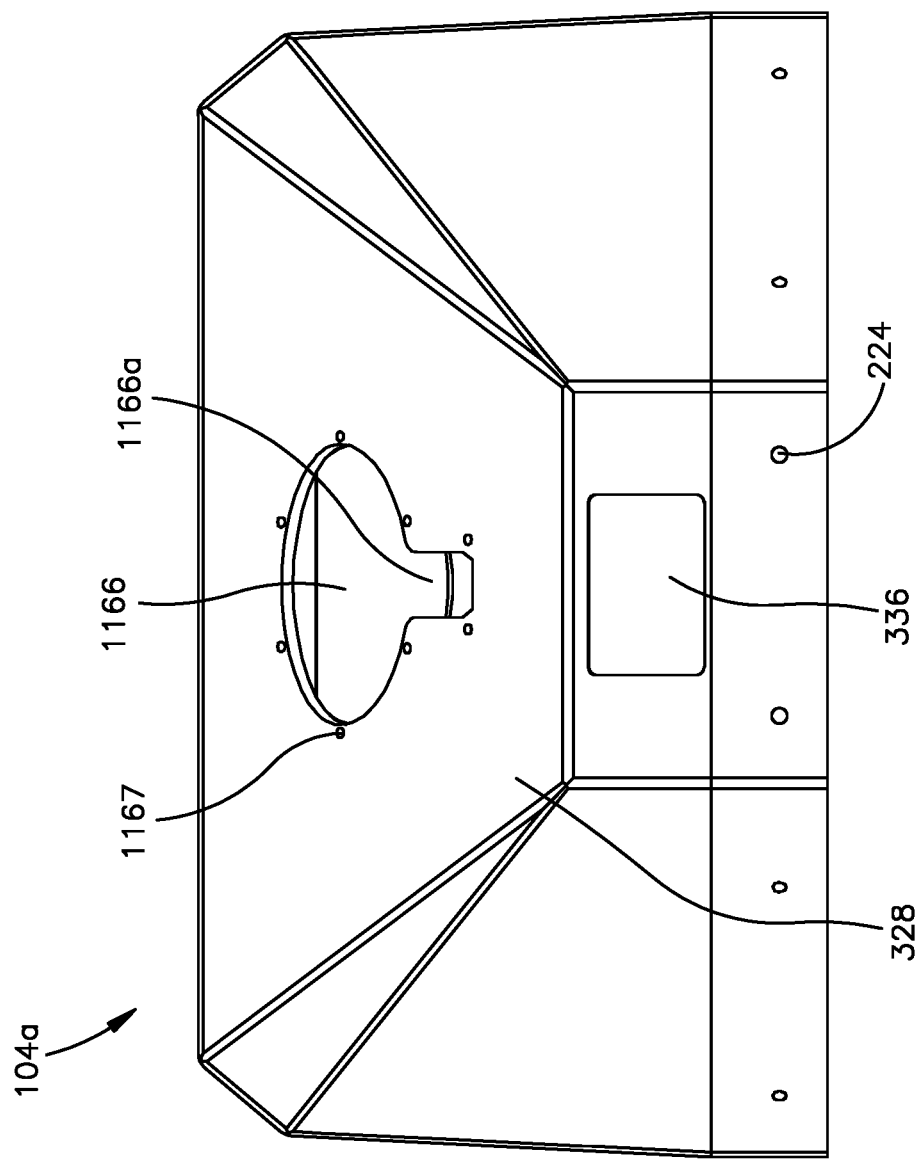
FIG. 11 illustrates a front view of an example exterior shell assembly.

Referring to FIG. 11 an example front end 328 of a test article is illustrated. Front end 328 may have a handle assembly aperture 1166 machined or molded therein to support handle assembly 332. Rear end 330 may have a similar aperture to support handle assembly 332. Handle cup 335 may extend into handle assembly aperture 1166 and be covered by handle cover 333 to form handle assembly 332. A geometry of handle assembly aperture 1066 may vary based on handle assembly 332. In one embodiment, notch 1166a is part of handle assembly aperture 1166 to accommodate extra functionality, such as hardware associated with interface 334. In another embodiment, handle assembly aperture 1166 does not include notch 1166a and is more circular in shape. Through holes 1167 around handle assembly aperture 1166 may provide a connection point to secure both of handle cover 333 and handle cup 335 (i.e. handle assembly 332) to a test article.

Figure 12:
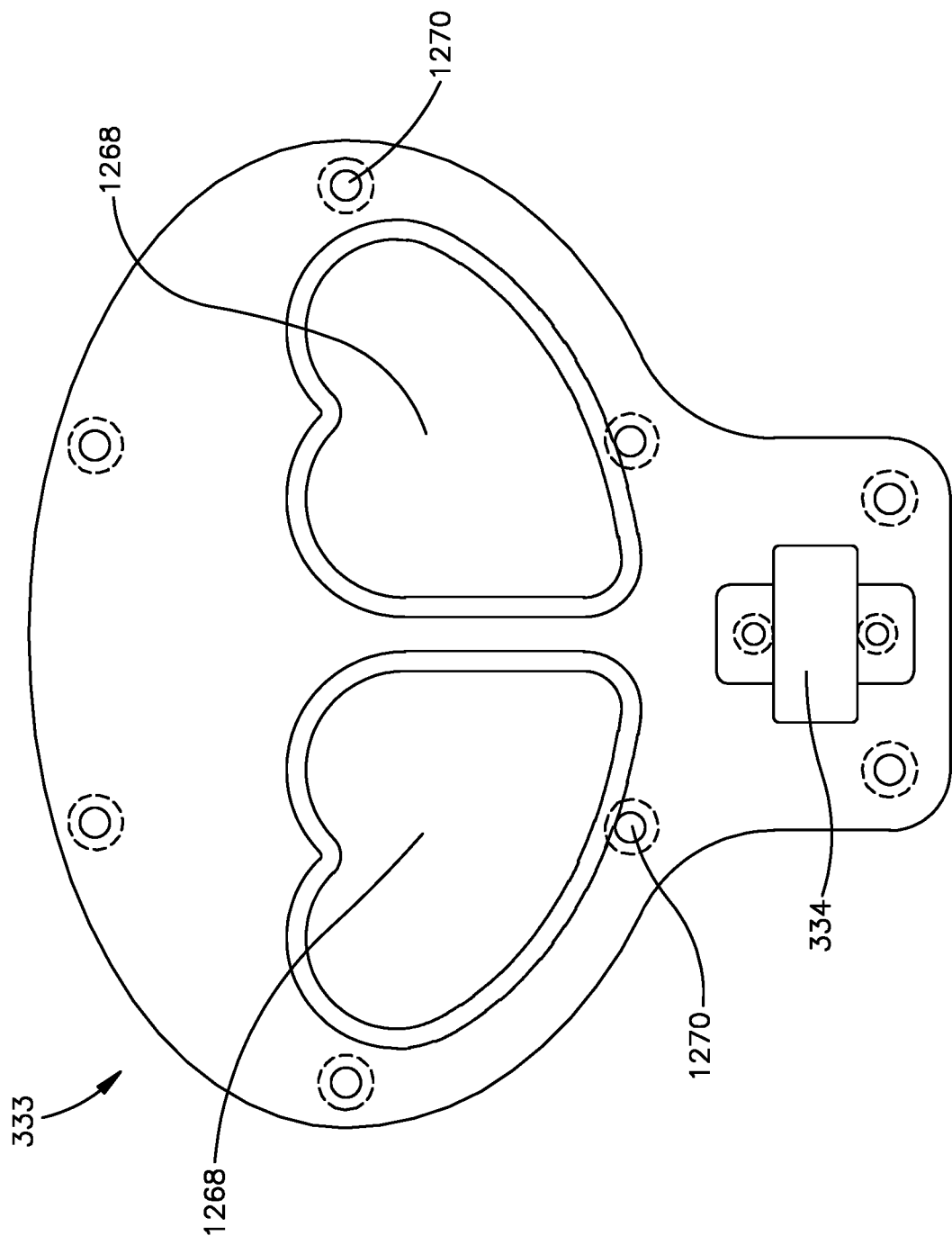
FIG. 12 illustrates an example handle cover.

Referring to FIG. 12, an example handle cover 333 is illustrated. Handle cover 333 may include one or more ergonomic grooves 1268 that may correspond with a user's fingers and allow for a user's fingers to extend through handle cover 333 and into handle cup 335 to facilitate carrying of a test article. Ergonomic grooves 1268 may allow a user to carry test article using any phalanx portions of the finger, and may allow a user's fingers to curl to provide a superior and ergonomic grip when carrying a test article. Handle cover holes 1270 disposed about handle cover 333 correspond to holes 1167 on an exterior shell assembly to allow for a mechanical connection through holes 1270 and 1167 to secure handle assembly 332 to an exterior shell assembly 106a, 106b. Connection hardware for securing handle assembly 332 to exterior shell assembly 106a, 106b may include screws, rivets, and the like.

Acetal Cylinder:

Acetal cylinder test object 218a may be slightly redesigned from the ANSI standard to address shortcomings not originally anticipated by the ANSI standard while not departing from the specifications and purpose of test object 218a as described in the ANSI standard. Acetal cylinder test object 218a may support one or more annular metal devices (rings) to test ($Z_{eff}$) and CT value uniformity on an x-ray CT system.

Figure 13:
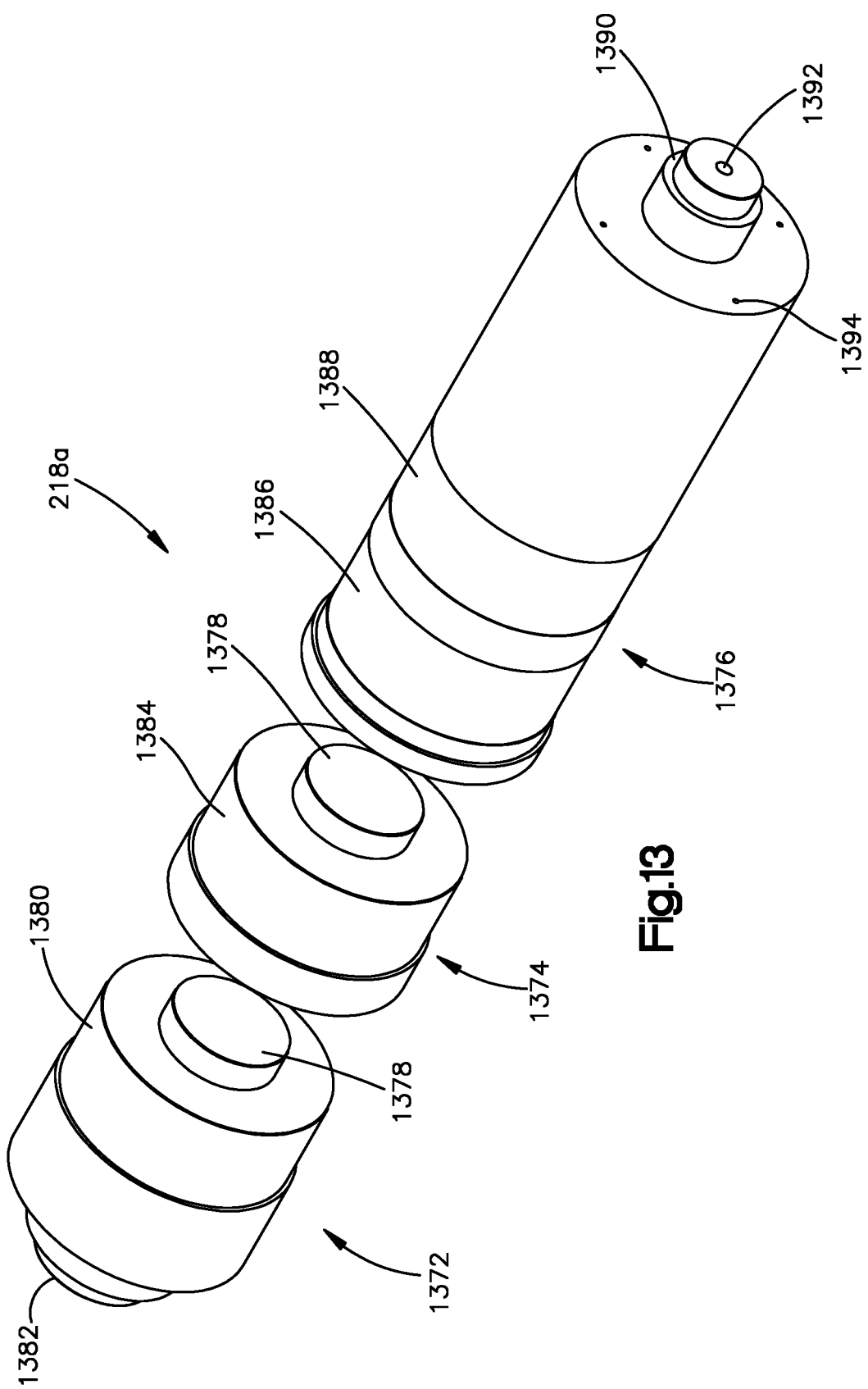
FIG. 13 illustrates an exploded view of an example test object.

With reference to FIG. 13, an exploded view of an example acetal cylinder test object for measuring ($Z_{eff}$) and CT value uniformity is illustrated. Unlike previous designs specified by the ANSI standard where acetal cylinders were a one piece construct with metal rings thereon, acetal cylinder test object 218a may be divided into two or more sections. In one embodiment, acetal cylinder test object 218a is divided into three sections—section 1372, 1374, and 1376. Sections 1372, 1374, and 1376 may interconnect to one another via raised portions 1378 and corresponding recesses (not shown) opposed to receive the raised portions 1378. A complete assembly of acetal cylinder test object 218a may be held together by partitions 216 on each side acetal cylinder test object 218a. Mounting protrusions 1382 on section 1372 and 1390 on section 1376 may correspond with cylinder support holes 549 on partitions 216 to hold acetal cylinder test object 218a. A strict tolerance of a spacing between partitions 216 with cylinder support holes 549 may be necessary to ensure section 1372, 1374, and 1376 remain coupled as a complete assembly of acetal cylinder test object 218a. Both mounting protrusions 1382 and 1390 may have hardware attachment apertures therein, such as hardware attachment aperture 1392 to receive connection hardware 646 therein to securely connect, and mount acetal cylinder test object 218a within internal support structure 213a.

Tin foil ring 1386 and lead foil ring 1388 on section 1376 may be adhered to section 1376 with an adhesive or the like.

Acetal cylinder test object 218a has been redesigned from the ANSI standard to include multiple sections such as sections 1372 and 1374. Use of multiple sections 1372 and 1374 allow for a metal annular device to be easily added to sections 1372 and 1374 and securely held in place when sections 1372 and 1374 are joined with other sections (i.e. 1376) to form a complete assembly of acetal cylinder test object 218a.

Prior to acetal cylinder test object design 218a, the copper ring and aluminum ring of prior acetal cylinder test objects, due to thermal expansion and contraction, would move about the acetal cylinder test object, such that each ring would continually vary its position on the acetal cylinder and its spacing relative to other metal rings. Routine handling of the prior test article would cause movement of the copper and aluminum rings. Movement of the copper and aluminum rings on previous designs caused a problem because an exact spacing between the metal rings could not be maintained.

Section 1372 of acetal cylinder test object 218a may include an undercut portion 1380 machined into a cylindrical shape to receive an annular metal device such as an aluminum ring. An aluminum ring may be machined to a specific inner diameter (I.D.) and outer diameter (O.D.) such that aluminum ring may easily slide onto the cylindrical-shaped undercut portion 1380. Similarly, section 1374 may include undercut portion 1384 for receiving an annular metal device such as a copper ring. A copper ring may be machined to specific dimensions to have a precise (e.g. snug and fit) fitting over undercut portion 1384. Connection of section 1372 to section 1374 with an annular metal device in place on undercut 1380 prevents movement of annual metal device about a longitudinal axis of acetal cylinder test object 218a. Similarly, connection of section 1374 to section 1376 while an annular metal device is in place on undercut 1384 prevents movement of annular metal device about a longitudinal axis of acetal cylinder test object 218a. Captivation of aluminum and copper rings prevents movement, and ensures accurate and repeatable results during image evaluation of an x-ray CT image producing system.

Acetal cylinder test object 218a may also be used as a streak artifact test object. One or more blind holes 1394 may be machined into an end of section 1376 in a direction along a longitudinal axis of acetal cylinder test object 218a. Blind holes 1394 may be used to support one or more metal pin used in a streak artifact testing procedure. Layout, spacing, and depth of blind holes 1394 may be specified in accordance with a technical standard or specification.

Figure 14:
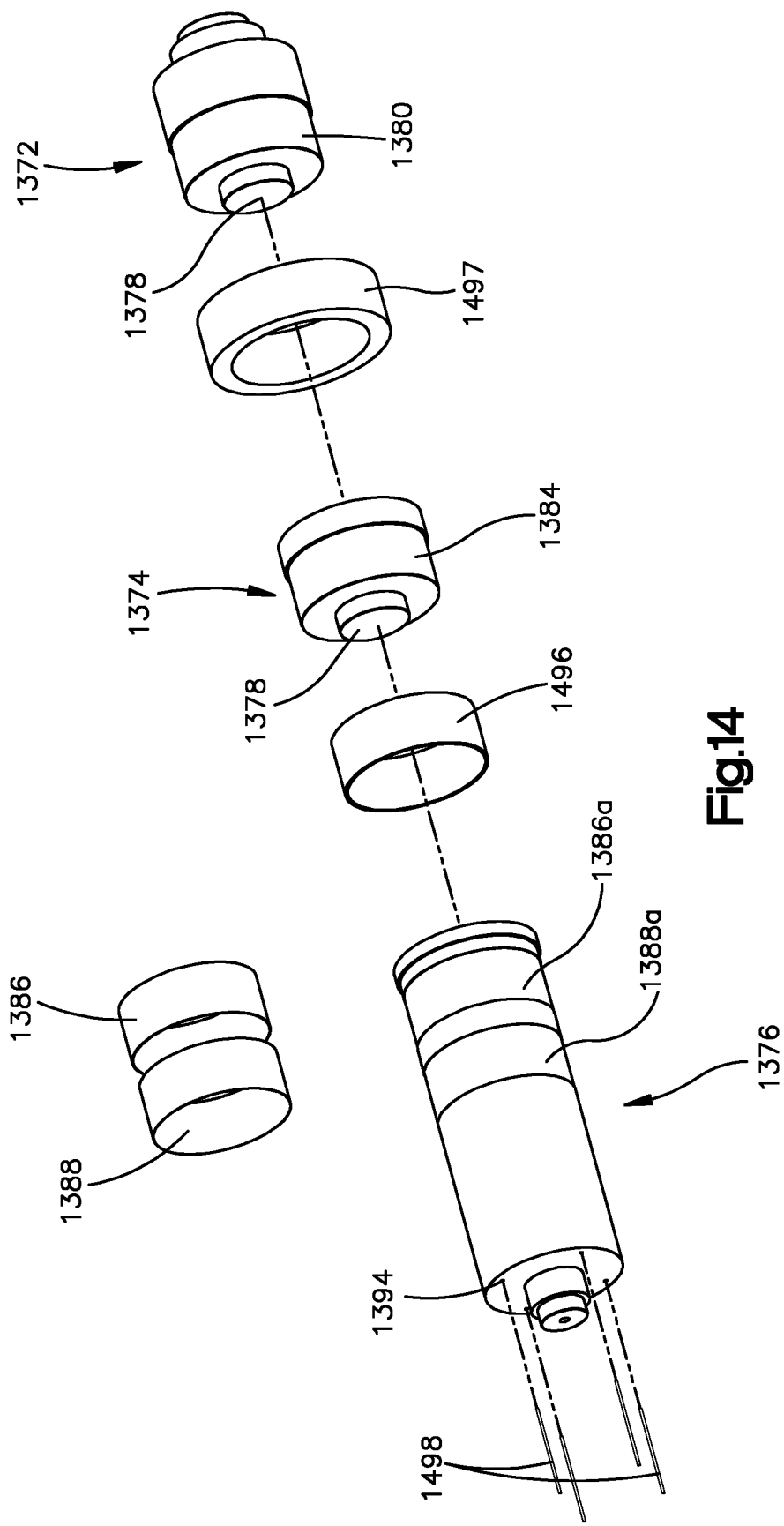
FIG. 14 illustrates an exploded view of an example test object.

Referring to FIG. 14 an exploded view of an example acetal cylinder test object 218a is provided. Copper ring 1496 may be machined for a precise fit over undercut 1384 on section 1374 while aluminum ring 1497 may be machined for a precise (e.g. snug or firm) fit over undercut 1380 on section 1372. Tin foil ring 1386 may be held in place by an adhesive in location 1486a on section 1376 while lead foil ring 1488 may be held in place by an adhesive in location 1488a on section 1376. Exact geometry, layout, spacing, positioning, and the like may be specified in accordance with a technical standard or specification.

Metal pins 1498 may be inserted into blind holes 1394 for use in streak artifact testing procedures. In one embodiment, metals pins 1498 may be tungsten or tungsten alloy pins.

Composite Structure:

One or more components of system 100 may be manufactured of a molded composite. An advantage of using a molded composite over traditional plastics and other materials, is that a molded composite may be of a lower density than other materials to allow for a greater passage of X-radiation through the composite, and thus less attenuation of the X-radiation compared to other materials. A greater passage of X-radiation to an inner volume of test articles 104a, 104b to interact with various test objects therein, provides for a better image evaluation of an x-ray CT image producing system. A molded composite material may also reduce an overall weight of test articles 104a, 104b while also increasing a durability and robustness of 104a, 104b.

Figure 15:
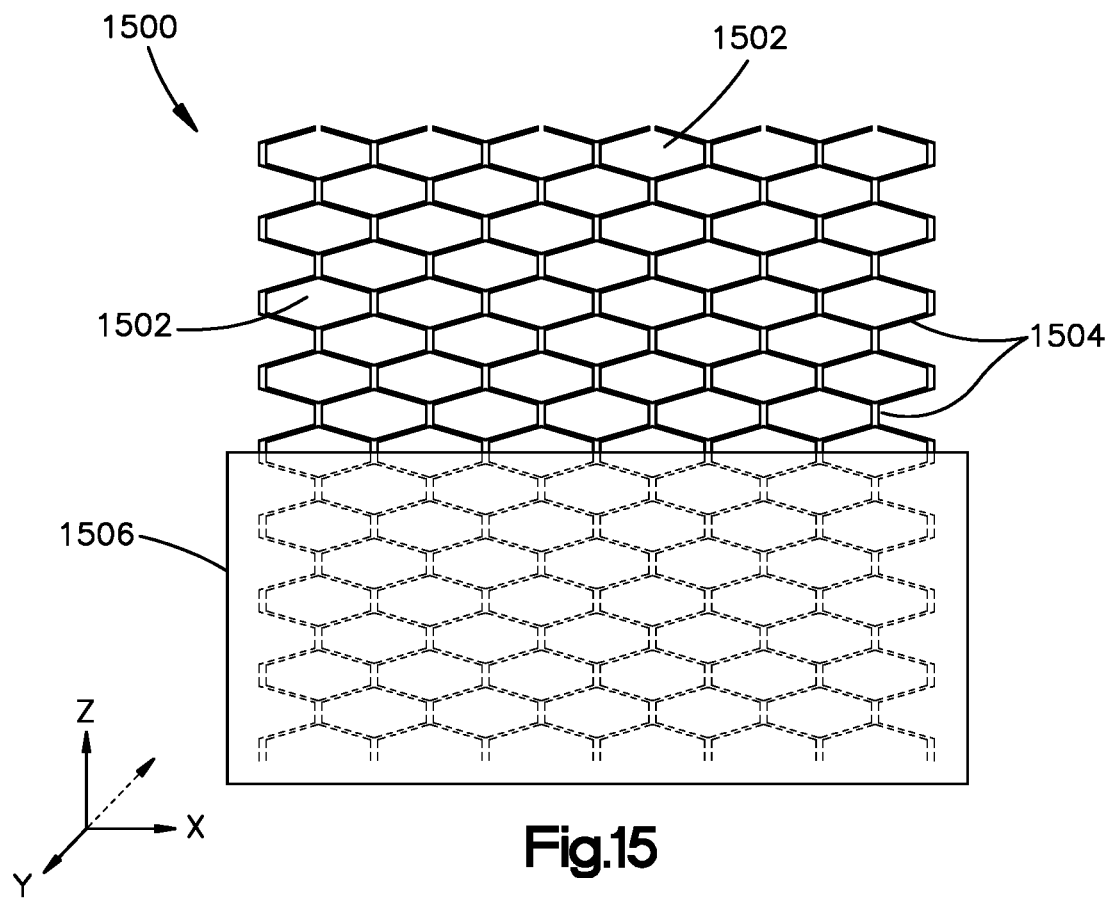
FIG. 15 illustrates an example hollow core structure.

Molded composite material may be molded from a combination of a resin matrix, a reinforcement material, and a hollow core structure. With reference to FIG. 15, an open side view of an example hollow core structure 1500 is illustrated. Hollow core structure may be a cellular structure of component cells (cores) 1502 interconnected by cellular walls 1504. Because a majority volume of cell 1502 is air, hollow core structure 1500, as used in a molded composite, may reduce an overall density of a composite material while also decreasing an overall weight of composite material. Use of hollow core structure 1500 may also reduce attenuation of X-radiation. As used herein, an open side of hollow core structure 1500 refers to each side of hollow core structure 1500 in a plane (xz plane) along a longitudinal axis (y-axis) for each cell. In one embodiment, hollow core structure 1500 is an open cell hexagonal honeycomb design of a polypropylene material. A thickness of hollow core structure 1500 as measured between both open sides may be about 0.20 inches thick. Thickness of walls 1504 may be about 0.005 inches. A polyester scrim cloth 1506 may be thermally fused to walls 1504 on each open side of hollow core structure 1500 to cover both open sides of hollow core structure to prevent an ingress of a resin matrix into cells 1502 during a composite molding process.

A reinforcement material may be used with a resin matrix to form a portion of a molded composite. Reinforcement material may be a woven material such as fiberglass mat, Kevlar, carbon fiber, and the like. In one embodiment, a reinforcement material may be a woven glass fiber material (i.e. fiberglass, fiberglass cloth). A combination of woven glass fiber material with an epoxy-based resin matrix may be commonly referred to as fiberglass or glass reinforced plastic. Reinforcement material may be chosen based on function, design, cost, and the like. For example, fiberglass mat may be used because of its costs, low attenuation of X-radiation, and other properties which may make fiberglass mat suitable for use in a composite mold.

Figure 16:
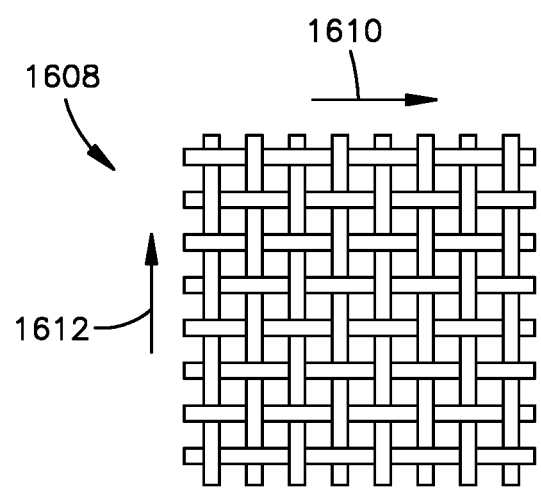
FIG. 16 illustrates an example woven material.

With reference to FIG. 16, an example woven glass fiber reinforcement (fiberglass cloth) 1608 is illustrated. Woven glass fiber reinforcement material may be woven using different weave patterns including: plain, Dutch, basket, twill, satin, and like weave patterns. Typically, a weave pattern will include fibers running in a "warp" direction as indicated by arrow 1610 and fibers running in a "weft," "woof," or "fill" direction as indicated by arrow 1612. Warp and fill fibers may be generally orthogonal to each other. Glass reinforced plastic composites may be multi-plied constructions—that is, multiple layers of fiberglass cloth may be overlapped to form a composite structure. Each layer of a fiberglass cloth may be a ply, such that a two-layer overlapping fiberglass cloth construction may be 2-ply construction, etc. In one embodiment, each overlapping fiberglass cloth layer in a multi-plied construction is in an opposite warp direction of an underlying fiberglass cloth layer to maximize a unidirectional strength of an overall assembly. Composite structures fabricated from glass reinforced plastic may be fabricated in either of a hand lay-up or spray lay-up operation.

Resin Matrix:

A resin matrix used in preparing molded composite components of system 100 may use a special combination of materials to decrease a density of the resin matrix. Silicon dioxide ($SiO_2$) may be added to the resin matrix to introduce micro-balloons into the matrix to further reduce the density of the matrix without compromising resin matrix strength. Similar to the effects of adding silicon dioxide to the resin matrix, calcium carbonate (CaCO$_3$) may also be added to the resin matrix to introduce micro-balloons. An example resin matrix formula based on a 400 gram batch is given in table 1.

TABLE 1

Resin Matrix Material Formula

| Description | Weigh (grams) |
|---|---|
| Resin | 400 |
| Silicon Dioxide | 12 |
| Calcium Carbonate | 32 |
| Curing Agent | 61.2 |
| Dye (Dark Blue) | 1.5 |
| Dye (White) | 4 |

Resin used in the resin matrix may be either a natural resin or a synthetic resin. In one embodiment, resin used in the resin matrix is an epoxy resin. In another embodiment, resin used in the resin matrix is a bisphenol F epoxy resin. In another embodiment, resin used in the resin matrix is a liquid epoxy resin manufactured from epichlorohydrin and bisphenol F. Resin used in the resin matrix may be a low viscosity liquid epoxy resin. Resin used in the resin matrix may have strong mechanical properties, and high temperature and chemical resistance. A curing agent used in the resin matrix may be a co-reactant for resin used in the resin matrix to act as a hardener/curative. A curing agent used in the resin matrix may accelerate a resin matrix curing process. In one embodiment, a curing agent used in the resin matrix is a curing agent used to cure bisphenol F epoxy resins. In another embodiment, a curing agent used in the resin matrix is an amine. In another embodiment, a curing agent used in the resin matrix is an aliphatic amine. In another embodiment, a curing agent used in the resin matrix is liquid imidazole. Resin matrix may be oven cured at a temperature of around (160° F.-165° F.) at about one atmosphere (14.7 lb./in$^2$) of vacuum. Dyes may be added to the resin matrix formula to color the resin matrix, and thus influence a final color of a molded and cured composite component.

Method of Manufacture:

A composite used to manufacture exterior shell assemblies 106a, 106b and base assemblies 208a, 208b of test articles 104a, 104b may be fabricated of specific plies of fiberglass cloth laminated to both sides of hollow core structure 1500 using a resin matrix. A laid-up composite may be vacuum bagged and oven cured under vacuum. In one embodiment, a ratio of 70% fiberglass cloth to 30% resin is used to provide a high strength, lightweight, low density composite assembly. Each composite assembly may comprise 2 inner plies and 2 outer plies of fiberglass cloth at a thickness of about 0.018 inches. Composite assemblies using plies of this thickness may provide test articles 104a, 104b with ample strength to endure a test environment while also reducing weight and attenuation of X-radiation. Artisan care during a composite lay-up process may be free of imperfections such as bridging, surface cracking, cloth wrinkle or gaps, resin starvation, etc. and may provide a smooth and/or textured surface free of pinholes. In corners of composite molded structures where hollow core structures 1500 meet, a thinner fiberglass cloth of about 0.010 inch thickness may be applied directly to a scrim cloth of each hollow core structure 1500 to prevent a resin matrix from wicking into corner seams. Taking care to seal corners seams to eliminated both excess resin accumulation at corners, and thus eliminates potential high density area which may negatively affect image evaluation of x-ray CT imaging systems. As mentioned previously, a composite assembly of fiberglass cloth, hollow core, and resin matrix may be oven cured at a temperature of around (160° F.-165° F.) at about one atmosphere (14.7 lb./in$^2$) of vacuum. Molding parts under vacuum will squeeze out all excess resin which may be captured (absorbed) in a breather/bleeder cloth within a vacuum bag during a molding process and discarded when a molding process is complete. Curing a composite assembly at a specific heat under vacuum may provide a stable, uniform bond.

Figure 17:
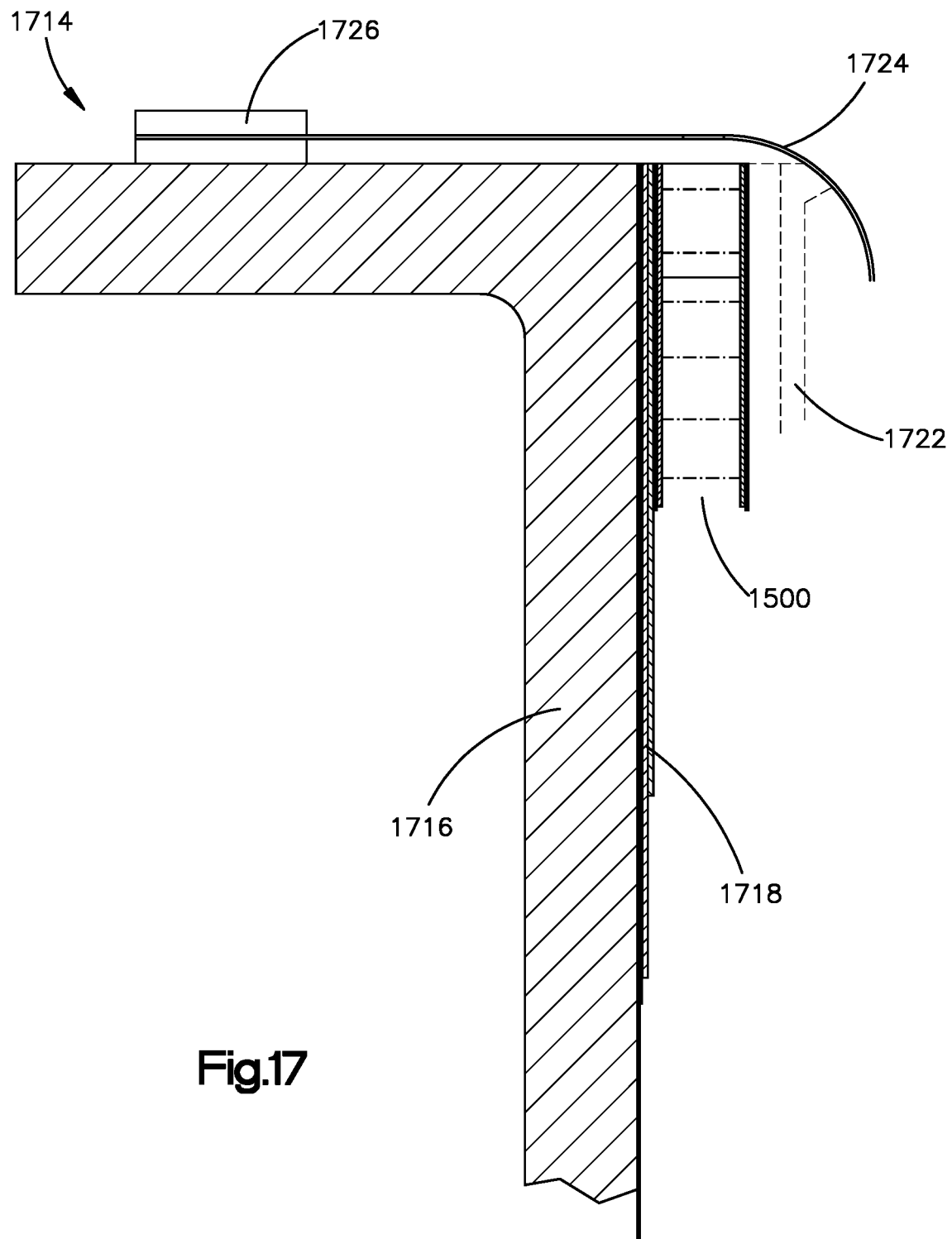
FIG. 17 illustrates an example vacuum molding lay-up.

With reference to FIG. 17, an example composite lay-up on a mold 1714 for vacuum molding is illustrated. A process of composite vacuum molding may comprise a mold 1716. Mold 1716 may be machined of a durable material such as aluminum and machined to precise tolerances to ensure uniform repeatability of composite molded components. A release agent may be sprayed or applied on mold 1716 to ensure separation of a composite assembly from mold 1716 at an end of a molding process. Exterior plies 1718 of fiberglass cloth/resin matrix combination may be laid-up against mold 1716 in a multi-plied construction as described above. Hollow core 1500 may be laminated to exterior plies 1718 and a breather/bleeder cloth 1722 may be placed on another open side of hollow core 1500 to absorb excess resin matrix. Vacuum bag 1724 may enclose composite assembly and sealed at vacuum seal 1726. Composite assembly may be oven cured at a specified temperature under vacuum. Vacuum molding of a composite assembly may include a complete layup and curing of an assembly or may require multiple lay-ups/curings to produce a finished composite assembly.

Figure 19:
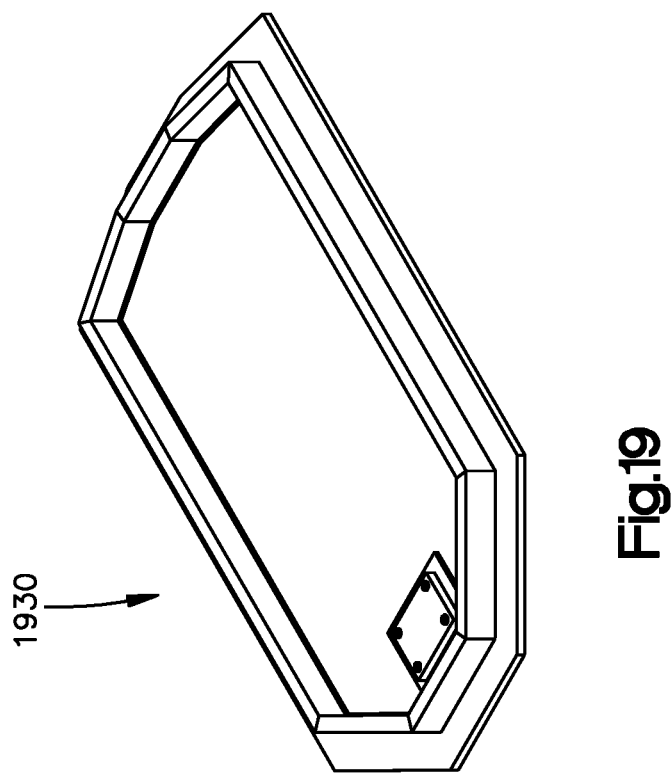
FIG. 19 illustrates an example molding tool.
Figure 18:
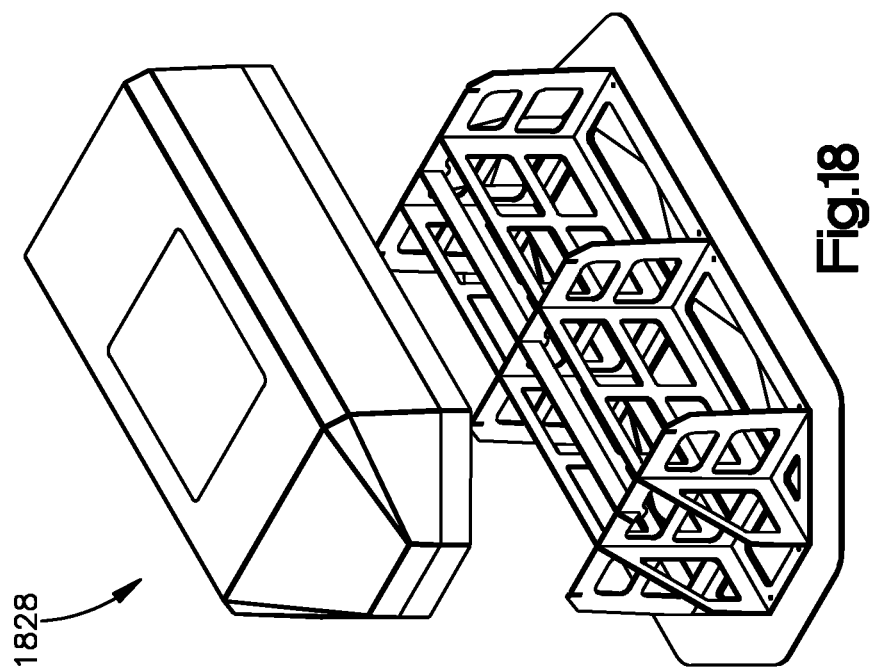
FIG. 18 illustrates an example molding tool.

With reference to FIGS. 18 and 19 example molds 1828 and 1930 used to lay up composite molded parts are illustrated. Molds 1828 and 1930 may be machined of a durable material to specifications and tolerances specified by a technical standard or specification. Molds 1828 and 1930 may be of a durable material capable of withstanding multiple moldings while maintaining a specified tolerance. Molds 1828 and 1930 may be of a durable material or combination of durable materials to withstand vacuum and heat curing while maintaining a specified tolerance. In one embodiment, portions of mold 1828 and 1930 are manufactured of metal and polymeric materials. Molds 1828 and 1930 may have surface treatments (such as powder coating, machining, etc.) to emboss a surface pattern onto a molded composite. In one embodiment, a Hammertone® powder coating finish is applied to molds 1828 and 1930 to emboss a Hammertone® appearance on composite molded parts.

Computer Evaluation Method:

A semi-automatic and/or automatic evaluation process may be developed to evaluate an image quality of x-ray CT security screening systems.

Given a limited number of security screening systems in the marketplace, centralized data libraries of image quality metrics and other metadata may be accumulated to generate baseline data for each security screening system.

If a security screening system passes a general test event which includes passing a system inspection and detection testing, image quality (IQ) metrics in addition to image data, and other metadata may be saved and stored at a centralized database location. Statistical results may also be recorded to a centralized database along with corresponding IQ metrics, image data, and metadata.

IQ metrics, image data, and metadata may be catalogued into a centralized database and given a unique identifier. The IQ metrics and image data may be analyzed by image analysis software with image analysis results being stored along with IQ metrics, image data, and metadata in a centralized database. Cataloged IQ metrics, image data, and metadata in a centralized results database may be stored for additional analysis and compared to existing data cataloged on a centralized results database. Statistical analysis of cataloged IQ metrics, image data, and meta data compared against baseline values may provide an indication of whether an image quality of a x-ray CT security screen system under test is within an acceptable range.

Search tools and graphical user interfaces (GUIs) analysis programs may be incorporated with centralized results database to allow for rapid and accurate specific queries of stored metadata. A GUI may be an IQ analysis tool that may provide for semi-automated or automated extraction of metadata from image data files for cataloging and storage in a centralized database. A GUI may be programmed to auto-populate metadata or allow for manual entry of metadata. A GUI may compare extracted metadata from a centralized database against a library of baseline metadata and use statistical analysis to determine whether an image quality (IQ) of a security screening system is within a passable range.

Unless specifically stated to the contrary, the numerical parameters set forth in the specification, including the attached claims, are approximations that may vary depending on the desired properties sought to be obtained according to the exemplary embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, methods, and apparatuses have been illustrated by describing example embodiments, and while the example embodiments have been described and illustrated in considerable detail, it is not the intention of the applicants to restrict, or in any way limit, the scope of the appended claims to such detail. It is, of course, not possible to describe every conceivable combination of components or methodologies for purposes of describing the systems, methods, and apparatuses. With the benefit of this application, additional advantages and modifications will readily appear to those skilled in the art. Therefore, the invention, in its broader aspects, is not limited to the specific details and illustrative example and exemplary embodiments shown and described. Accordingly, departures may be made from such details without departing from the spirit or scope of the general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

As used in the specification and the claims, the singular forms "a," "an," and "the" include the plural. To the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. Finally, where the term "about" is used in conjunction with a number, it is intended to include ±10% of the number. In other words, "about 10" may mean from 9 to 11.

What is claimed:

1. A dosimeter assembly for use in an x-ray computed tomography system test article, the dosimeter assembly comprising:
   a dosimeter having a display;
   a dosimeter shelf that supports the dosimeter; and
   an alignment bracket that positions the dosimeter on the dosimeter shelf,
   wherein the dosimeter shelf is operable to be mounted within the x-ray computed tomography system test article, and the display of the dosimeter is viewable through a dosimeter window which is disposed at a front end of the x-ray computed tomography system test article,
   wherein the dosimeter assembly is accessible through an access panel directly beneath the dosimeter assembly, wherein the access panel being an opening which is disposed on a base of the x-ray computer tomography system test article; and
   the dosimeter is operably connected to a connection interface which is configured to exchange communication with an external device.

2. The dosimeter assembly of claim 1, wherein the alignment bracket is operably connected to the dosimeter shelf and operable to align the dosimeter within the x-ray computer tomography system test article such that a dosimeter display is viewable through a dosimeter window on the x-ray computer tomography system test article.

3. The dosimeter assembly of claim 1, wherein the connection interface is wiredly connected to the dosimeter within the x-ray computed tomography system test article.

4. The dosimeter assembly of claim 1, wherein the connection interface is wirelessly connected to the dosimeter within the x-ray computed tomography system test article.

5. The dosimeter assembly of claim 1, wherein the connection interface is on an outside surface of the x-ray computed tomography system test article and operably connected to the dosimeter within the x-ray computed tomography system test article.

6. The dosimeter assembly of claim 1, further comprising one or more connection hardware, wherein the dosimeter is attached to the dosimeter shelf using the one or more connection hardware.

7. The dosimeter assembly of claim 1, wherein the alignment bracket provides a proper positioning of the dosimeter.

8. The dosimeter assembly of claim 5, wherein the connection interface is a USB plug.

9. The dosimeter assembly of claim 6, wherein the one or more hardware is one of: a cable tie, a tie-wrap or hardware screws.

* * * * *